US010255603B1

(12) United States Patent
Rezayee et al.

(10) Patent No.: US 10,255,603 B1
(45) Date of Patent: Apr. 9, 2019

(54) PROCESSOR POWER SUPPLY GLITCH MITIGATION

(71) Applicant: Square, Inc., San Francisco, CA (US)

(72) Inventors: Afshin Rezayee, Richmond Hill (CA); Malcolm Ronald Smith, Toronto (CA); Yue Yang, Toronto (CA)

(73) Assignee: Sqaure, Inc., San Francisco, CA (US)

( * ) Notice: Subject to any disclaimer, the term of this patent is extended or adjusted under 35 U.S.C. 154(b) by 0 days.

(21) Appl. No.: 15/693,456

(22) Filed: Aug. 31, 2017

(51) Int. Cl.
| G06Q 20/34 | (2012.01) |
| H04L 9/08 | (2006.01) |
| G06Q 20/40 | (2012.01) |
| G06Q 20/38 | (2012.01) |
| G06Q 20/32 | (2012.01) |
| G06F 21/57 | (2013.01) |

(52) U.S. Cl.
CPC ......... *G06Q 20/405* (2013.01); *G06F 21/575* (2013.01); *G06Q 20/3278* (2013.01); *G06Q 20/34* (2013.01); *G06Q 20/3829* (2013.01); *H04L 9/0891* (2013.01); *G06Q 2220/00* (2013.01)

(58) Field of Classification Search
CPC ............................. G06Q 20/405; G06F 9/4411
See application file for complete search history.

(56) References Cited

U.S. PATENT DOCUMENTS

| 5,870,289 A | 2/1999 | Tokuda et al. |
| 5,960,084 A * | 9/1999 | Angelo ................... G06F 21/34 |
| | | 235/380 |
| 6,056,193 A | 5/2000 | McAuliffe et al. |
| 6,786,420 B1 | 9/2004 | Silverbrook |
| 7,124,170 B1 | 10/2006 | Sibert |
| 7,343,496 B1 | 3/2008 | Hsiang et al. |
| 7,837,110 B1 | 11/2010 | Hess et al. |
| 7,878,397 B2 | 2/2011 | Mirkazemi-Moud et al. |
| 8,344,881 B1 | 1/2013 | Hays |
| 8,499,173 B2 | 7/2013 | Caci |
| 8,786,272 B2 | 7/2014 | Carapelli et al. |
| 9,342,717 B2 | 5/2016 | Claessen |
| 9,575,840 B1 * | 2/2017 | Spangler ............. G06F 11/1417 |
| 9,659,178 B1 | 5/2017 | Wade |

(Continued)

FOREIGN PATENT DOCUMENTS

| EP | 2 031 537 A1 | 3/2009 |
| WO | 2017/139633 A1 | 8/2017 |
| WO | 2018/111601 A1 | 6/2018 |

OTHER PUBLICATIONS

Non-Final Office Action dated Aug. 25, 2016, for U.S. Appl. No. 14/183,118, of Wade, J., filed Feb. 18, 2014.

(Continued)

*Primary Examiner* — Phil K Nguyen
(74) *Attorney, Agent, or Firm* — Maynard Cooper & Gale, P.C.; Jon E. Holland, Esq.

(57) ABSTRACT

A transaction device includes a bootloader that a processing unit executes during device startup. The bootloader causes the processing unit to access values from a persistent memory that are relevant to whether a glitch has occurred on a power supply for the processing unit. Based on the values that are acquired from the persistent memory, the processing unit may implement countermeasures, such as disabling certain device operations or delaying the device booting process.

35 Claims, 9 Drawing Sheets

(56) References Cited

U.S. PATENT DOCUMENTS

| | | |
|---|---|---|
| 9,665,870 B1 | 5/2017 | Rezayee et al. |
| 9,778,711 B2* | 10/2017 | Chang ..................... G06F 1/24 |
| 9,799,180 B1 | 10/2017 | Rezayee et al. |
| 9,892,293 B1 | 2/2018 | Wade et al. |
| 10,127,409 B1 | 11/2018 | Wade et al. |
| 2004/0095830 A1 | 5/2004 | Tanaka |
| 2006/0038011 A1 | 2/2006 | Baker et al. |
| 2006/0155899 A1 | 7/2006 | Knapp |
| 2008/0091605 A1 | 4/2008 | Hughes et al. |
| 2008/0198653 A1* | 8/2008 | Brederlow ............. G11C 16/10 365/185.03 |
| 2010/0264211 A1 | 10/2010 | Jain et al. |
| 2010/0327856 A1 | 12/2010 | Lowy |
| 2011/0078034 A1 | 3/2011 | Hayhow |
| 2011/0107136 A1* | 5/2011 | Jonnagadla ............. G06F 9/546 714/3 |
| 2011/0307711 A1* | 12/2011 | Novak .................. G06F 21/575 713/188 |
| 2012/0056635 A1 | 3/2012 | Oomura |
| 2012/0201379 A1* | 8/2012 | Fuchs .................. H04L 9/0877 380/255 |
| 2012/0274351 A1 | 11/2012 | Pedersen et al. |
| 2013/0044003 A1 | 2/2013 | Eguro et al. |
| 2013/0086691 A1 | 4/2013 | Fielder |
| 2013/0119974 A1 | 5/2013 | Chamarti et al. |
| 2013/0140364 A1 | 6/2013 | McJones et al. |
| 2013/0179351 A1 | 7/2013 | Wallner |
| 2013/0254431 A1 | 9/2013 | Kuroiwa et al. |
| 2013/0339739 A1* | 12/2013 | Hueber .................. G06F 21/72 713/171 |
| 2014/0025960 A1* | 1/2014 | McLean ................ G06F 21/575 713/189 |
| 2014/0181534 A1 | 6/2014 | Nowottnick |
| 2014/0297540 A1 | 10/2014 | Swamy et al. |
| 2015/0097572 A1 | 4/2015 | Wade et al. |
| 2015/0331767 A1* | 11/2015 | Bringivijayaraghavan ................. G06F 11/3034 714/6.21 |
| 2016/0029221 A1 | 1/2016 | Suarez Garcia et al. |
| 2016/0117225 A1* | 4/2016 | Yu ....................... G06F 11/1666 714/15 |
| 2016/0357963 A1* | 12/2016 | Sherman ............... G06F 21/566 |
| 2017/0236125 A1 | 8/2017 | Guise et al. |

OTHER PUBLICATIONS

Non-Final Office Action dated Sep. 15, 2016, for U.S. Appl. No. 15/011,347, of Rezayee, A., et al., filed Jan. 29, 2016.

Notice of Allowance dated Jan. 20, 2017, for U.S. Appl. No. 14/183,118, of Wade, J., filed Feb. 18, 2014.

Notice of Allowance dated Jan. 26, 2017, for U.S. Appl. No. 15/011,347, of Rezayee, A., et al., filed Jan. 29, 2016.

Non-Final Office Action dated Apr. 3, 2017, for U.S. Appl. No. 15/382,165, of Wade, J., et al., filed Dec. 16, 2016.

Notice of Allowance dated Jun. 21, 2017, for U.S. Appl. No. 15/011,367, of Rezayee, A., et al., filed Jan. 29, 2016.

Notice of Allowance dated Sep. 19, 2017, for U.S. Appl. No. 15/382,165, of Wade, J., et al., filed Dec. 16, 2016.

Non-Final Office Action dated Jan. 11, 2018, for U.S. Appl. No. 15/382,122, of Wade, J., et al., filed Dec. 16, 2016.

Non-Final Office Action dated Apr. 18, 2018, for U.S. Appl. No. 15/043,233, of Guise, M., et al., filed Feb. 12, 2016.

Notice of Allowance dated Jul. 26, 2018, for U.S. Appl. No. 15/382,122, of Wade, J., et al., filed Dec. 16, 2016.

International Search Report and Written Opinion for International Application No. PCT/US2017/017453, dated Mar. 30, 2017.

International Search Report and Written Opinion for International Application No. PCT/US2017/064545, dated Feb. 28, 2018.

Non-Final Office Action dated Oct. 3, 2018, for U.S. Appl. No. 15/476,324, of Wade, J., filed Mar. 31, 2017.

Final Office Action dated Oct. 19, 2018, for U.S. Appl. No. 15/043,233, of Guise, M., et al., filed Feb. 12, 2016.

Notice of Allowance dated Dec. 12, 2018, for U.S. Appl. No. 15/476,324, of Wade, J., filed Mar. 31, 2017.

* cited by examiner

PROCESSOR POWER SUPPLY GLITCH MITIGATION

BACKGROUND

Electronic payments may be performed in a variety ways. A payment terminal may process payment transactions, and may interact with payment devices such as a payment card having a magnetic strip that is swiped in a magnetic reader of the payment terminal, a payment device having a Europay/Mastercard/Visa (EMV) chip that is dipped into corresponding EMV slot of the payment terminal, and near field communication (NFC) enabled devices such as a smartphone or EMV card that is tapped to the payment terminal and transmits payment information over a secure wireless connection. The payment terminal may receive payment information from the payment device as well information about a transaction, and may communicate this information to a payment system for processing of the transaction.

As of a result of its central role in the transaction processing system, the payment terminal is a prime target for third party attackers attempting to access payment information, process fraudulent transactions, and otherwise engage in fraudulent activities or theft. In many cases, the attackers attempt to physically access components of the payment terminal, such as one or more communication lines carrying data or a processor that communicates and processes payment information. Attackers may attempt to eavesdrop on signals (e.g., a passive attack) or to modify or spoof payment processing communications (e.g., an active attack) by injecting malicious signals into the payment terminal.

Some attacks may attempt to induce unanticipated conditions within the payment terminal. The unanticipated conditions may cause circuitry to operate in an abnormal manner that facilitates access to components, and in some instances, may cause code executed by a processor to operate in an unanticipated manner such as by branching in an unexpected manner or skipping portions of code. Attackers may exploit the payment terminal's response to the unanticipated conditions to gain access to information stored within the payment terminal, to engage in fraudulent transactions, or to monitor activities of the payment terminal.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

Figure 1:
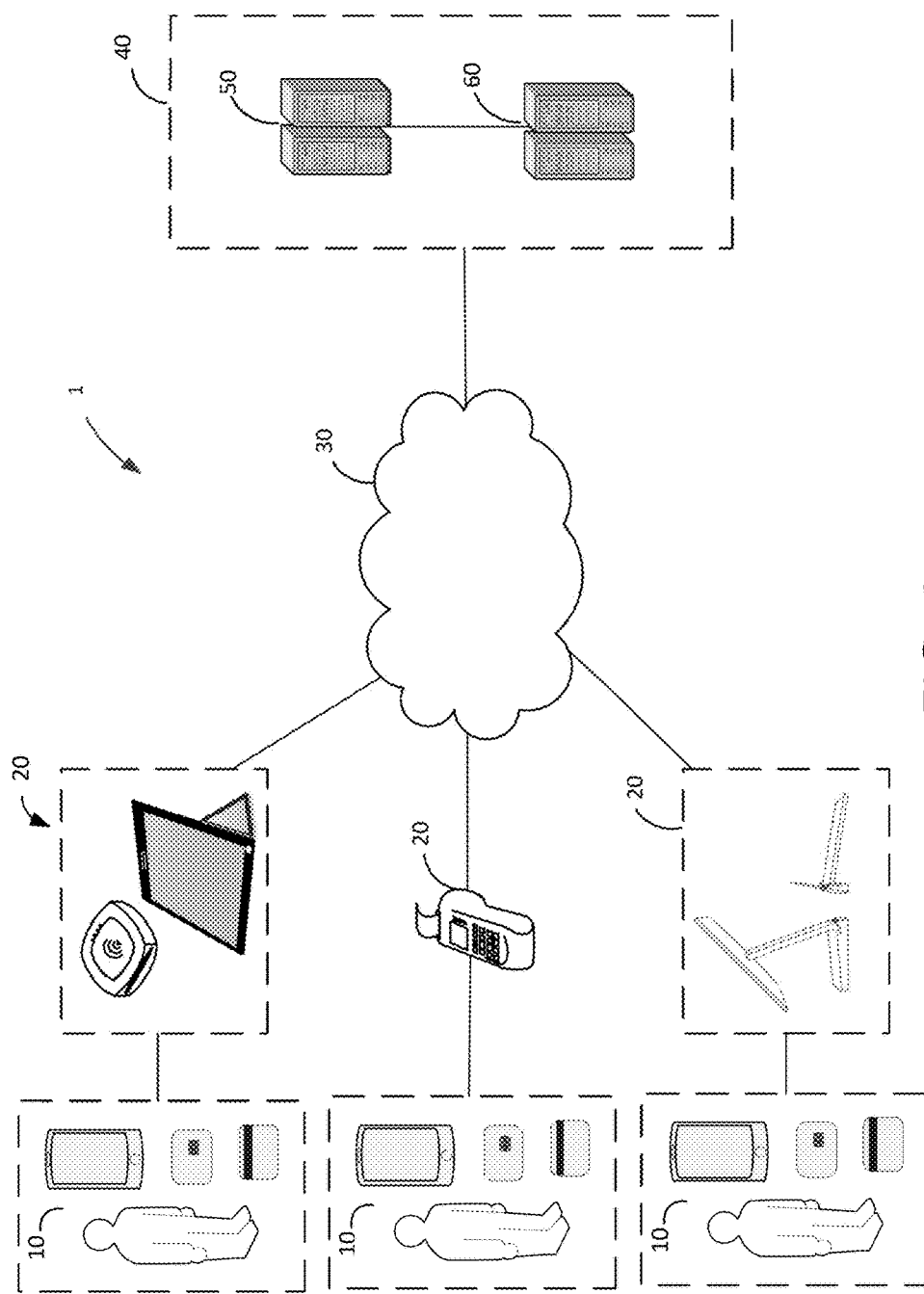
FIG. 1 shows an illustrative block diagram of a payment system in accordance with some embodiments of the present disclosure.

An electronic payment terminal such as a payment reader may interface with various types of payment devices. For example, smart phones and smart watches have NFC payment applications that allow a customer to "tap" in close proximity to the payment terminal in order to pay. Payment information is transmitted and received wirelessly over a radio frequency (RF) connection between the payment device and the payment reader. EMV cards include an EMV chip that is "dipped" into a slot in the payment reader. The EMV card typically remains in the reader, and communicates with the payment reader through a physical electrical connection. Once the transaction is complete, the EMV card may be removed. Also, many payment cards retain traditional "swipe" technology in which information about a payment card is transferred to the payment reader by swiping a magnetic card stripe through a magnetic reader of the payment reader.

Because the payment reader plays a central role in the acquisition and processing of payment information, payment readers are frequently subject to attacks from malicious actors who attempt to access confidential payment information or process fraudulent transactions. One such attempted attack may be a processor glitch attack, in which an attacker attempts to cause a processor to execute instructions incorrectly by tampering with the power supply of the processor. Attackers attempt to access the power supply for the processor and apply a glitch (e.g., a short duration low or high voltage) to the processor power supply. In some instances, such a glitch may cause the processor to operate incorrectly such as by skipping instructions or incorrectly performing calculations.

Techniques may be employed to detect and mitigate processor power supply glitches. Glitch detection circuitry may monitor components that generate and process the processor power supply, such as components of power supply circuitry. Certain components of power supply circuitry (e.g., an output of a comparison circuit that compares a reference voltage and a power supply feedback voltage) may provide a direct indication that a glitch attack is occurring. In some instances, multiple components and terminals that are likely to be tampered with for glitch attacks or that provide signals indicative of a glitch attack may be monitored. A glitch indicator is generated when the glitch detection circuitry identifies a glitch.

Glitches may also be detected by monitoring the operation of the processing unit. An exception handler executed by the processing unit generates exceptions when anomalous processing operations occur. These anomalous processing operations may be indicative of a glitch. Identifying information for the exception may be acquired as well as information relating to the severity of the exception (e.g., with respect to likely glitch attacks).

Some glitch attacks, because they are impacting the processor power supply, may cause a reset of the processor and reader. Accordingly, the glitch indicator, exception information, and other information relevant to glitch attacks may be stored in a persistent memory such as a battery-backed memory so that the glitch information is accessible after resets or anomalous processor operations. The battery-backed memory may also store information that controls the execution of glitch detection and mitigation software routines, which may allow such routines to be executed without occupying significant instruction space, such as in bootloader code.

The processor may execute glitch instructions to access glitch values from the battery-backed memory. Based on the glitch data (e.g., glitch indicators, exception counts, exception identifiers, etc.) and glitch control information the glitch instructions may identify the presence of a glitch and take one or more corrective actions, such as imposing delays during boot or during sensitive processing operations, disabling operation of one or more components of the payment reader, erasing encryption keys, and sending notifications to external devices such as a payment server.

FIG. 1 depicts an illustrative block diagram of a payment system 1 in accordance with some embodiments of the present disclosure. In one embodiment, payment system 1 includes a payment device 10, payment terminal 20, network 30, and payment server 40. In an exemplary embodiment, payment server 40 may include a plurality of servers operated by different entities, such as a payment service system 50 and a bank server 60. These components of payment system 1 facilitate electronic payment transactions between a merchant and a customer.

The electronic interactions between the merchant and the customer take place between the customer's payment device 10 and the merchant's payment terminal 20. The customer has a payment device 10 such as a credit card having magnetic stripe, a credit card having an EMV chip, or a NFC-enabled electronic device such as a smart phone running a payment application. The merchant has a payment terminal 20 such as a payment terminal or other electronic device that is capable of processing payment information (e.g., encrypted payment card data and user authentication data) and transaction information (e.g., purchase amount and point-of-purchase information), such as a smart phone or tablet running a payment application.

In some embodiments (e.g., for low-value transactions or for payment transactions that are less than a payment limit indicated by a NFC or EMV payment device 10) the initial processing and approval of the payment transaction may be processed at payment terminal 20. In other embodiments, payment terminal 20 may communicate with payment server 40 over network 30. Although payment server 40 may be operated by a single entity, in one embodiment payment server 40 may include a suitable number of servers operated by suitable entities, such as a payment service system 50 and one or more banks of the merchant and customer (e.g., a bank server 60). The payment terminal 20 and the payment server 40 communicate payment and transaction information to determine whether the transaction is authorized. For example, payment terminal 20 may provide encrypted payment data, user authentication data, purchase amount information, and point-of-purchase information to payment server 40 over network 30. Payment server 40 may determine whether the transaction is authorized based on this received information as well as information relating to customer or merchant accounts, and responds to payment terminal 20 over network 30 to indicate whether or not the payment transaction is authorized. Payment server 40 may also transmit additional information such as transaction identifiers to payment terminal 20.

Based on the information that is received at payment terminal 20 from payment server 40, the merchant may indicate to the customer whether the transaction has been approved. In some embodiments such as a chip card payment device, approval may be indicated at the payment terminal, for example, at a screen of a payment terminal. In other embodiments such as a smart phone or watch operating as a NFC payment device, information about the approved transaction and additional information (e.g., receipts, special offers, coupons, or loyalty program information) may be provided to the NFC payment device for display at a screen of the smart phone or watch or storage in memory.

In some embodiments, an attacker or other user may attempt to acquire payment information by monitoring transmissions or gaining access to components of payment system 1. As an example, each of these components of payment system 1 may provide an opportunity for an attacker to eavesdrop on payment and transaction information or to inject malicious signals. For example, an attacker may attempt to monitor signals that are relayed between any of payment device 10, payment terminal 20, network 30, and payment server 40. Because the payment terminal 20 interacts with both the payment server 40 and the payment device, the payment terminal 20 may be prime target for attackers. Attackers may attempt to inject malicious signals to cause the hardware or processor of the payment terminal 20 to function in ways that were not intended by the manufacturer of the payment terminal 20. In some instances, an attacker may attempt to inject "glitches" into the power supply (e.g., a temporarily low power supply value) to critical components such as a processor of the payment terminal 20. A glitch may not cause a reset condition (i.e., the processor continues to operate) but may cause the processor to fail to read inputs, fail to provide outputs, incorrectly interpret values accessed from memory, skip or repeat instructions, or perform in other manners that are unexpected and result in undesirable functioning of the processor. Attackers may inject glitches repeatedly and/or in patterns to determine the response to glitches and identify vulnerabilities that may permit access to information stored at the payment terminal, spoofing of communications with the processor, injection of malicious code into the processor, and other similar attacks.

In some embodiments, one or more techniques may be utilized to prevent, identify, and remedy glitch attacks. Glitch attacks may be identified by monitoring aspects of the power conversion circuitry that supplies the power supply to the processor and other related components (e.g., memory). Certain components of the power conversion circuitry may respond to glitch attempts in a manner that is identifiable, detection circuitry may capture the glitch attempts and initiate a response. In an embodiment, code such as the bootloader of the code that is executed by the processor may include a countermeausure routine that identifies the occurrence of likely glitch events (e.g., based on exceptions identified by an exception handler) and performs countermeasures (e.g., during boot) to prevent glitch attempts. In some embodiments, the underlying code executed by the software may be modified in a manner to prevent successful glitch attacks, such as by duplicating branch-and-compare instructions and introducing a random delay between duplicated instructions.

Figure 2:
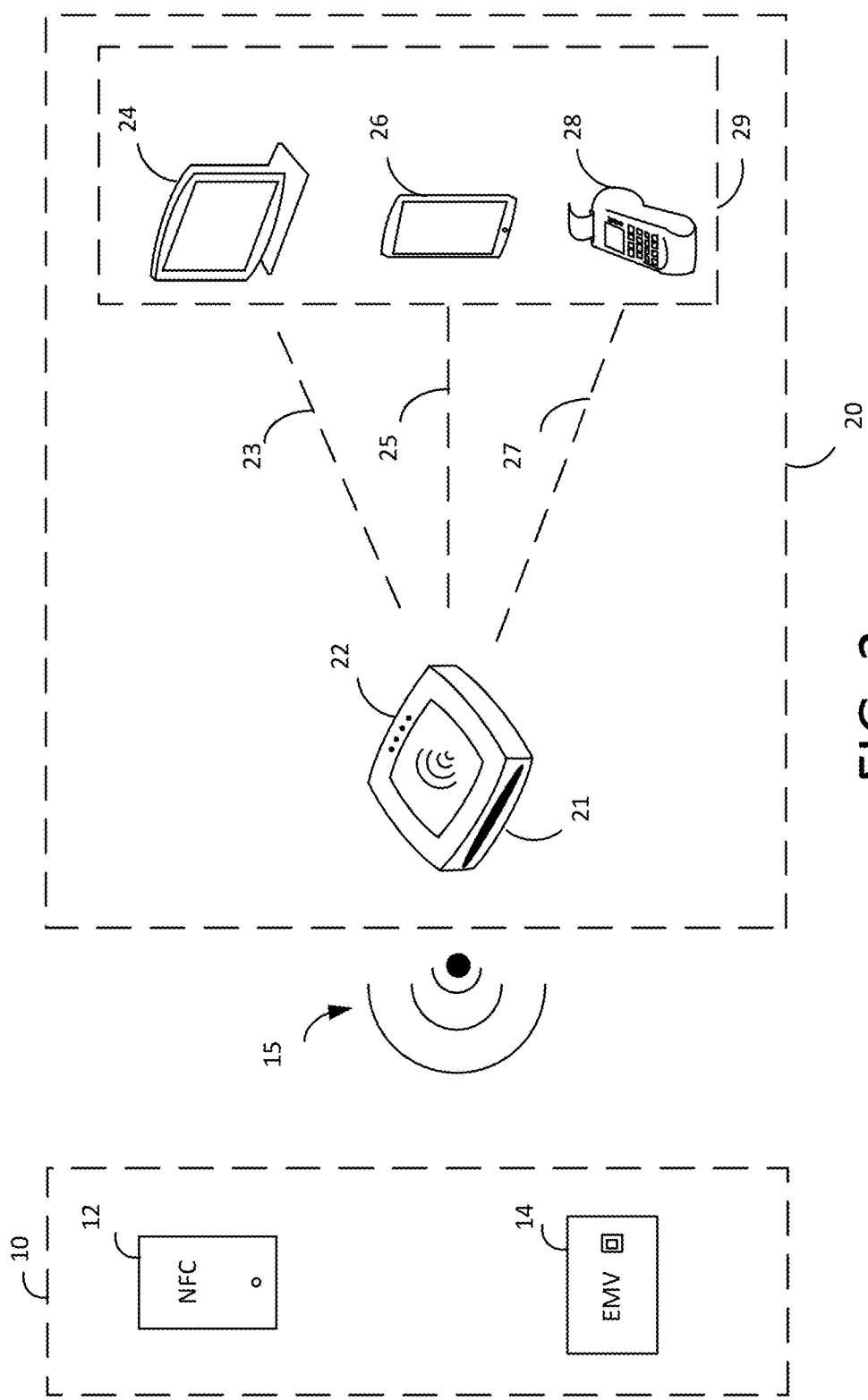
FIG. 2 depicts an illustrative block diagram of a payment device and payment terminal in accordance with some embodiments of the present disclosure.

FIG. 2 depicts an illustrative block diagram of payment device 10 and payment terminal 20 in accordance with some embodiments of the present disclosure. Although it will be understood that payment device 10 and payment terminal 20 of payment system 1 may be implemented in a suitable manner, in one embodiment the payment terminal 20 may comprise a payment reader 22 and a merchant device 29. However, it will be understood that as used herein, the term payment terminal may refer to a suitable component of the payment terminal, such as payment reader 22. In an embodiment, the payment reader 22 of payment terminal 20 may be a wireless communication device that facilitates transactions between the payment device 10 and a merchant device 29 running a point-of-sale application.

In one embodiment, payment device 10 may be a device that is capable of communicating with payment terminal 20 (e.g., via payment reader 22), such as a NFC device 12 or an EMV chip card 14. Chip card 14 may include a secure integrated circuit that is capable of communicating with a payment terminal such as payment terminal 20, generating encrypted payment information, and providing the encrypted payment information as well as other payment or transaction information (e.g., transaction limits for payments that are processed locally) in accordance with one or more electronic payment standards such as those promulgated by EMVCo. Chip card 14 may include contact pins for communicating with payment reader 22 (e.g., in accordance with ISO 7816) and in some embodiments, may be inductively coupled to payment reader 22 via a near field 15. A chip card 14 that is inductively coupled to payment reader 22 may communicate with payment reader 22 using load modulation of a wireless carrier signal that is provided by payment reader 22 in accordance with a wireless communication standard such as ISO 14443.

NFC device 12 may be an electronic device such as a smart phone, tablet, or smart watch that is capable of engaging in secure transactions with payment terminal 20 (e.g., via communications with payment reader 22). NFC device 12 may have hardware (e.g., a secure element including hardware and executable code) and/or software (e.g., executable code operating on a processor in accordance with a host card emulation routine) for performing secure transaction functions. During a payment transaction NFC device 12 may be inductively coupled to payment reader 22 via near field 15 and may communicate with payment terminal 20 by active or passive load modulation of a wireless carrier signal provided by payment reader 22 in accordance with one or more wireless communication standards such as ISO 14443 and ISO 18092.

Although payment terminal 20 may be implemented as a single device or multiple devices, in an embodiment payment terminal 20 may include a payment reader 22 and a merchant device 29. The merchant device 29 runs a point-of-sale application that provides a user interface for the merchant and facilitates communication with the payment reader 22 and the payment server 40. Payment reader 22 may facilitate communications between payment device 10 and merchant device 29. As described herein, a payment device 10 such as NFC device 12 or chip card 14 may communicate with payment reader 22 via inductive coupling. This is depicted in FIG. 2 as near field 15, which comprises a wireless carrier signal having a suitable frequency (e.g., 13.56 MHz) emitted from payment reader 22.

In one embodiment, payment device 10 may be a contactless payment device such as NFC device 12 or chip card 14, and payment reader 22 and the contactless payment device 10 may communicate by modulating the wireless carrier signal within near field 15. In order to communicate information to payment device 10, payment reader 22 changes the amplitude and/or phase of the wireless carrier signal based on data to be transmitted from payment reader 22, resulting in a wireless data signal that is transmitted to the payment device. This signal is transmitted by an antenna of payment reader 22 that is tuned to transmit at 13.56 MHz, and if the payment device 10 also has a suitably tuned antenna within the range of the near field 15 (e.g., 0 to 10 cm), the payment device receives the wireless carrier signal or wireless data signal that is transmitted by payment reader 22. In the case of a wireless data signal, processing circuitry of the payment device 10 is able to demodulate the received signal and process the data that is received from payment reader 22.

When a contactless payment device such as payment device 10 is within the range of the near field 15, it is inductively coupled to the payment reader 22. Thus, the payment device 10 is also capable of modulating the wireless carrier signal via active or passive load modulation. By changing the tuning characteristics of the antenna of payment device 10 (e.g. by selectively switching a parallel load into the antenna circuit based on modulated data to be transmitted) the wireless carrier signal is modified at both the payment device 10 and payment reader 22, resulting in a modulated wireless carrier signal. In this manner, the payment device is capable of sending modulated data to payment reader 22.

In some embodiments, payment reader 22 also includes an EMV slot 21 that is capable of receiving chip card 14. Chip card 14 may have contacts that engage with corresponding contacts of payment reader 22 when chip card 14 is inserted into EMV slot 21. Payment reader 22 provides power to an EMV chip of chip card 14 through these contacts and payment reader 22 and chip card 14 communicate through a communication path established by the contacts.

Payment reader 22 may also include hardware for interfacing with a magnetic strip card (not depicted in FIG. 2). In some embodiments, the hardware may include a slot that guides a customer to swipe or dip the magnetized strip of the magnetic strip card such that a magnetic strip reader can receive payment information from the magnetic strip card. The received payment information is then processed by the payment reader 22.

Payment reader 22 directly interfaces with payment devices, and through merchant device 29, communicates with payment servers and other transaction processing systems. Payment reader 22 thus has access to information about users, payment devices, transactions, and merchants, as well as cryptographic keys and other critical information that is used to engage in transactions. Accordingly, payment reader 22 may be a target for attacks such as glitch attacks, and may employ glitch attack detection, mitigation, and prevention techniques as described herein.

Merchant device 29 may be a suitable device such as tablet payment device 24, mobile payment device 26, or payment terminal 28. In the case of a computing device such as tablet payment device 24 or mobile payment device 26, a point-of-sale application may provide for the entry of purchase and payment information, interaction with a customer, and communications with a payment server 40. For example, a payment application may provide a menu of services that a merchant is able to select and a series of menus or screens for automating a transaction. A payment application may also facilitate the entry of customer authentication information such as signatures, PIN numbers, or biometric information. Similar functionality may also be provided on a dedicated payment terminal 28. Accordingly, a merchant device 29 may also be a target for attacks such as glitch attacks, and may employ glitch attack detection, mitigation, and prevention techniques as described herein.

Merchant device 29 may be in communication with payment reader 22 via a communication path 23/25/27. Although communication path 23/25/27 may be implemented via a wired (e.g., Ethernet, USB, FireWire, Lightning) or wireless (e.g., Wi-Fi, Bluetooth, NFC, or ZigBee) connection, in one embodiment payment reader 22 may communicate with the merchant device 29 via a Bluetooth low energy interface, such that the payment reader 22 and the merchant device 29 are connected devices. In some embodiments, processing of the payment transaction may occur locally on payment reader 22 and merchant device 29, for example, when a transaction amount is small or there is no connectivity to the payment server 40. In other embodiments, merchant device 29 or payment reader 22 may communicate with payment server 40 via a public or dedicated communication network 30. Although communication network 30 may be a suitable communication network, in one embodiment communication network 30 may be the internet and payment and transaction information may be communicated between payment terminal 20 and payment server 40 in an encrypted format such by a transport layer security (TLS) or secure sockets layer (SSL) protocol.

Figure 3:
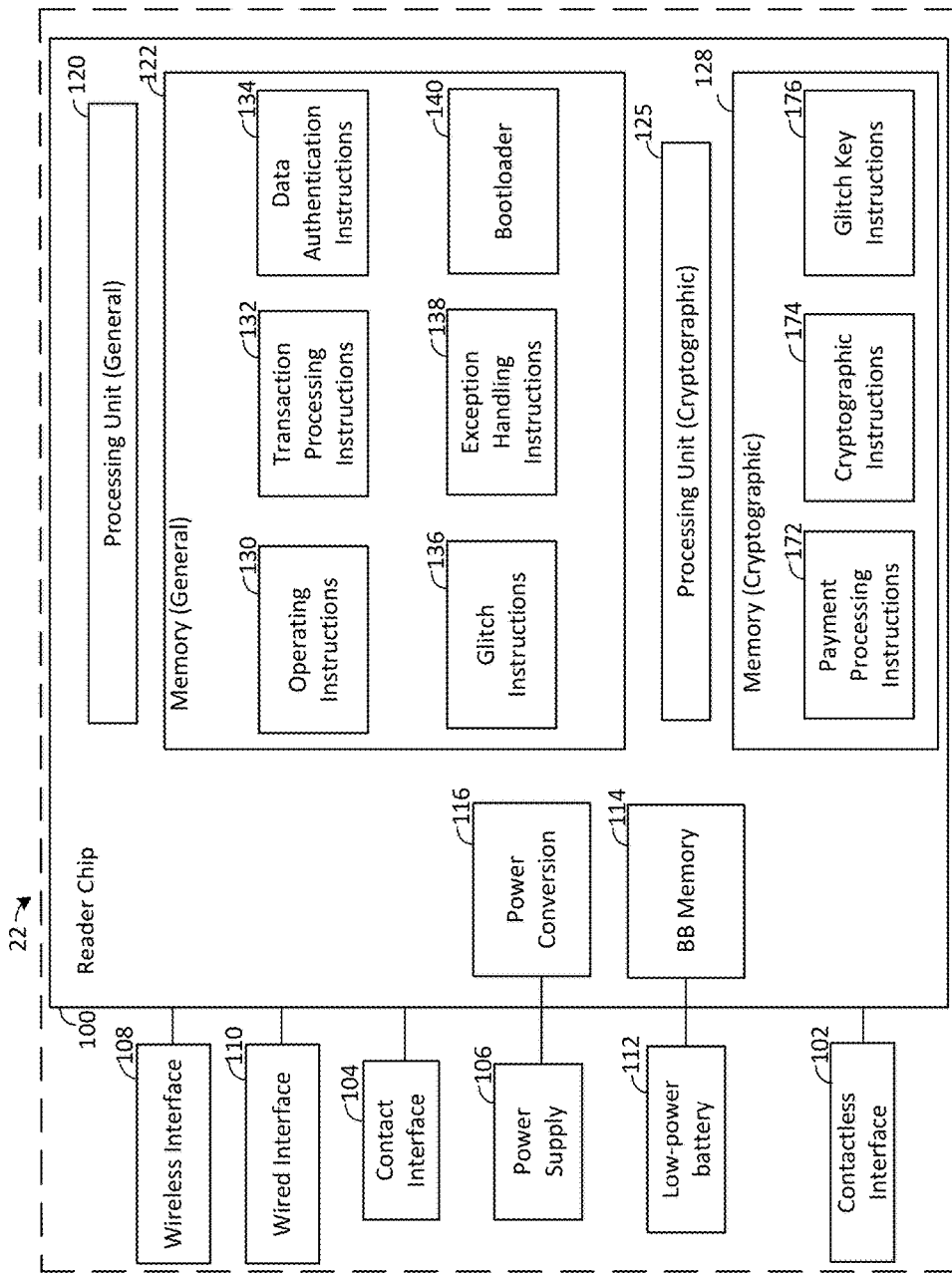
FIG. 3 depicts an illustrative block diagram of a payment reader in accordance with some embodiments of the present disclosure.

FIG. 3 depicts a block diagram of an exemplary payment reader 22 in accordance with some embodiments of the present disclosure. Although particular components are depicted in a particular arrangement in FIG. 3, it will be understood that payment reader 22 may include additional components, one or more of the components depicted in FIG. 3 may not be included in payment reader 22, and the components of payment reader 22 may be rearranged in a suitable manner. In some embodiments, some or all of the components of payment reader may be a portion of a unitary payment terminal 20, or may be implanted within a separate merchant terminal 29. Moreover, it will be understood that aspects of a merchant terminal 29 (e.g., merchant user interfaces, external communication interfaces, application processors, etc.) may be implemented in a payment reader 22.

In one embodiment, payment reader 22 includes a reader chip 100, a plurality of payment interfaces (e.g., a contactless interface 102 and a contact interface 104), a power supply 106, a wireless communication interface 108, a wired communication interface 110, and a low-power battery 112. In an embodiment, the reader chip 100 of payment reader 22 may include a general processing unit 120, general memory 122, a cryptographic processing unit 125 and cryptographic memory 128, battery-backed memory 114, and power conversion circuitry 116. Although in one embodiment the a general processing unit 120, general memory 122, a cryptographic processing unit 125 and cryptographic memory 128, battery-backed memory 114, and power conversion circuitry 116 will be described as packaged in a reader chip 100, and configured in a particular manner, it will be understood that each of these components may be located and configured in a variety of suitable manners to perform the functionality of the payment reader 22 as is described herein. It will also be understood that the functionality of reader chip 100 may be embodied in a single chip or a plurality of chips, each including a suitable combination of processing units, memory, and other components to collectively perform the functionality of reader chip 100 described herein.

In some embodiments, reader chip 100 may be a suitable chip having a processing unit. Processing unit 120 of reader chip 100 of payment reader 22 may be a suitable processor and may include hardware, software, memory, and circuitry as is necessary to perform and control the functions of payment reader 22. Processing unit 120 may include one or more processors, and may perform the operations of reader chip 100 based on instructions provided from a suitable number of memories and memory types. In some embodiments, processing unit 120 may have multiple independent processing units, for example a multi-core processor or other similar component. In an embodiment, processing unit 120 may execute instructions stored in memory 122 of reader chip 100 to control the operations and processing of payment reader 22. As used herein, a processor or processing unit may include one or more processors having processing capability necessary to perform the processing functions described herein, including but not limited to hardware logic (e.g., hardware designed by software that that describes the configuration of hardware, such as hardware description language (HDL) software), computer readable instructions running on a processor, or a suitable combination thereof. A processor may run software to perform the operations described herein, including software accessed in machine readable form on a tangible non-transitory computer readable storage medium.

In an exemplary embodiment, the processing unit 120 of reader chip 100 may include two RISC processors configured to operate as a hub for controlling operations of the various components of payment reader 22, based on instructions stored in memory 122. As used herein, memory may refer to a suitable tangible or non-transitory storage medium. Examples of tangible (or non-transitory) storage medium include disks, thumb drives, and memory, etc., but do not include propagated signals. Tangible computer readable storage medium include volatile and non-volatile, removable and non-removable media, such as computer readable instructions, data structures, program modules or other data. Examples of such media include RAM, ROM, EPROM, EEPROM, SRAM, flash memory, disks or optical storage, magnetic storage, or any other non-transitory medium that stores information that is accessed by a processor or computing device.

Reader chip 100 may also include additional circuitry such as interface circuitry, analog front end circuitry, security circuitry, signal conditioning circuitry, and monitoring component circuitry. In one embodiment, interface circuitry may include circuitry for interfacing with a wireless communication interface 108 (e.g., Wi-Fi, Bluetooth classic, and Bluetooth low energy), circuitry for interfacing with a wired communication interface 110 (e.g., USB, Ethernet, FireWire, and Lightning), circuitry for interfacing with other communication interfaces or buses (e.g., I²C, SPI, UART, and GPIO), and circuitry for interfacing with a power supply 106 (e.g., power management circuitry, power conversion circuitry, rectifiers, and battery charging circuitry).

In an exemplary embodiment, reader chip 100 may perform functionality relating to processing of payment transactions, interfacing with payment devices, cryptography, and other payment-specific functionality. In some embodiments, reader chip 100 may include a cryptographic processing unit 125 for handling cryptographic processing operations. Note that each of general processing unit 120 and cryptographic processing unit 125 may have dedicated memory associated therewith (e.g., general memory 122 and cryptographic memory 128). In this manner, specific cryptographic processing and critical security information (e.g., cryptographic keys, passwords, user information, etc.), may be securely stored by cryptographic memory 128 and processed by cryptographic processing unit 125.

One or both of general processing unit 120 and cryptographic processing unit 125 of reader chip 100 may communicate with the other (e.g., processing unit 120 may communicate with cryptographic processing unit 125 and vice versa), for example, using a suitable internal bus and communication technique. In this manner, reader chip 100 can process transactions and communicate information regarding processed transactions (e.g., with merchant device 29).

Reader chip 100 may also include circuitry for interacting with a contact interface 104 (e.g., power and communication circuitry for directly interfacing with signals received from a EMV chip of a chip card 14 that is inserted into slot 21). In some embodiments, reader chip 100 also may also include a signal conditioning and analog front end circuitry for interfacing with contactless interface 102 (e.g., electromagnetic compatibility (EMC) circuitry, matching circuits, modulation circuitry, and measurement circuitry).

Contactless interface 102 may provide for NFC communication with a contactless device such as NFC device 12 or chip card 14. Based on a signal provided by reader chip 100, an antenna of contactless interface 102 may output either a carrier signal or a modulated signal. A carrier signal may be a signal having a fixed frequency such as 13.56 MHZ. A modulated signal may be a modulated version of the carrier signal according to a modulation procedure such as ISO 14443 and ISO 18092. When the payment reader 22 is inductively coupled to a contactless device, the contactless device may also modulate the carrier signal, which may be sensed by the contactless interface 102 and provided to the reader chip 100 for processing. Based on these modulations of the carrier signal, payment reader 22 and a contactless device are able to communicate information such as payment information.

Contact interface 104 may be a suitable interface for providing power to a payment chip such as an EMV chip of a chip card 14 and communicating with the EMV chip. Contact interface 104 may include a plurality of contact pins (not depicted in FIG. 3) for physically interfacing with the chip card 14 according to EMV specifications. In some embodiments, contact interface 104 may include a power supply (VCC) pin, a ground (GND) pin, a reset (RST) pin for resetting an EMV card, a clock (CLK) pin for providing a clock signal, a programming voltage (VPP) pin for providing a programming voltage to an EMV card, an input output (I/O) pin for providing for EMV communications, and two auxiliary pins. In this manner, the payment reader and the chip card 14 are able to exchange information such as payment information. Note that, in some embodiments, contact interface 104 may be housed on reader chip 100 and may communicate with the various components of reader chip 100 via suitable means (e.g., a common internal bus).

Power supply 106 may include one or more power supplies such as a physical connection to AC power, DC power, or a battery. Power supply 106 may include power conversion circuitry for converting an AC or DC power source into a plurality of DC voltages for use by components of payment reader 22. When power supply 106 includes a battery, the battery may be charged via a physical power connection, via inductive charging, or via any other suitable method. Although not depicted as physically connected to all of the other components of the payment reader 22 in FIG. 3, power supply 106 may supply a variety of voltages to the components of the payment reader 22 in accordance with the requirements of those components. In the exemplary embodiment of FIG. 3, power supply may provide power to power conversion circuitry 116 of reader chip 100, which may provide a power source for one or more of the processors and memories of the reader chip, as described herein. In some embodiments (not depicted herein), the power conversion circuitry 116 may be located elsewhere within the payment reader, such as at power supply 106.

In some embodiments, power conversion 116 circuitry may provide a power source for components of reader chip 100, such as the general processing unit 120, general memory 122, cryptographic processing unit 125, and cryptographic memory 128. A power supply voltage may be provided from power supply 106 to the reader chip 100 and may be provided at a first voltage used to supply multiple components throughout the payment reader (e.g., a 3.3V supply voltage). It may be desirable to optimize the voltage that is provided to certain components of the reader chip 100 in a manner that balances power consumption with satisfying requirements for operation of the components. In an embodiment, reader chip 100 may include power conversion circuitry 116 that generates a power source for certain reader chip components (e.g., a processing unit power supply having a target processing unit power supply voltage) based on one or more power inputs received directly or indirectly from the power supply 106. In an exemplary embodiment, power conversion circuitry 116 may receive a power source such as a 3.3V power source from power supply 106 and generate the target power supply voltage based on the received 3.3V power source. In some embodiments, the target power supply voltage may be based on a reference voltage that is generated internally to reader chip 100 or external to reader chip 100. In some embodiments, the target power supply voltage may be adjustable, for example, by the processing unit to facilitate operation under particular operating conditions that are optimized at particular operating voltages for the processing units and/or other components connected to the processing unit power supply (e.g., low battery conditions, firmware updates, etc.).

Because the power conversion circuitry 116 provides a processing unit power supply to one or more of the processing units, and in some embodiments, additional critical components such as memories, the power conversion circuit 116 may be targeted by attackers. Attackers may attempt to tamper with the inputs and/or outputs of the power conversion circuit in a manner that allows the attacker to access critical information or introduce other errors to certain components of the reader chip 100, such as causing errors (e.g., skipping of instructions) by the general processing unit 120 or the cryptographic processing unit 125 during the execution of instructions. In some embodiments, power conversion circuitry 116 may include glitch detection circuitry that monitors particular signals within the power conversion circuitry that are related to tamper attempts. Although particular glitch detection circuitry monitoring particular signals may be described herein, glitch detection circuitry can detect causes of glitches (e.g., based on measurements of voltage, current, capacitance, etc.) such as attempts to connect a terminal of the power conversion circuitry 116 to ground. Glitch detection circuitry may also detect the manifestation of the glitches, such as by identifying short term positive or negative spikes in the supplied voltage or current or in intermediate signals that are used to produce the supplied voltage and current. In some embodiments, multiple types of glitch detection techniques may be combined to produce overall glitch detection determinations (e.g., glitch "scores"). In some embodiments, statistical techniques such as statistical data fit analysis may be applied to identify signal characteristics (e.g., glitch period, slope, etc.) that are related to known glitch attack types. If a glitch is identified by the power conversion circuitry 116, a glitch indicator may be stored within the power conversion circuitry 116 (e.g., within a storage element) or may be provided to other circuitry such as battery-backed memory 114 for persistent storage. Providing the glitch indicator for persistent storage may allow for the presence of the glitch to be identified during subsequent operations of the reader chip (e.g., subsequent boot cycles).

In some embodiments, one or more additional power sources such as low-power battery 112 may be provided for low power operation, for example, when the majority of components of the payment reader 22 are powered down, or when a main battery of the power source 16 cannot power the payment reader 22. Although a low-power battery may be implemented in a variety of suitable manners, in an embodiment a low-power battery may be a battery such as a coin-cell battery. In an exemplary embodiment, such low-power battery 112 may provide for critical functions such as safety or security functions to occur even when the payment reader 22 is not powered up. Although suitable types of critical functions may be powered by such a low-power battery, in an exemplary embodiment a low-power battery may enable periodic monitoring of tamper attempts, e.g., to be able to monitor for tampering even when the payment reader 22 is not powered, and maintaining power to a battery-backed memory 114 such as battery-backed RAM.

Battery-backed memory 114 may be a suitable readable and writable memory that allows for storage of values under conditions when the payment reader is not receiving external power, does not have power from the payment reader battery, or otherwise is limiting power supply to the reader chip 100. In an exemplary embodiment, battery-backed memory 114 receives power from a low-power source (e.g., low-power battery 112) that provides power for critical operations such as tamper detection operations. In an embodiment, battery-backed memory 114 may be physically located on the reader chip 100 in a manner that facilitates prompt access by the processing units thereof. In some embodiments, a glitch detector of power conversion circuitry 116 may provide a glitch indicator directly for storage within battery-backed memory 114. Battery-backed memory 114 may also receive information related to possible processing unit power supply glitches from other components of reader chip 100 or payment reader 22. In some embodiments, one or more processing units may provide information related to glitches to the battery-backed memory 114 as the information is acquired, such as by providing information relating to exception occurrences during processing unit operation. In this manner, if a glitch causes a device reset or otherwise causes aberrant operations to be performed by one or more of the processing units, the glitch indicator may still be stored within the battery-backed memory the next time that a check is performed by components such as one or more of processing units (e.g., during a processing unit boot procedure executing bootloader code). Although glitch-related information is described as being provided to battery-backed memory 114 of a reader chip 100 herein, it will be understood that some or all of the glitch-related information may be provided to battery-backed memory 114 located external to the reader chip 100 or at other memory of the reader chip 100 or payment reader 22.

Wireless communication interface 108 may include suitable wireless communications hardware (e.g., antennas, matching circuitry, etc.) and one or more processors having processing capability necessary to engage in wireless communication (e.g., with a merchant device 29 via a protocol such as Bluetooth low energy) and control associated circuitry, including but not limited to hardware logic, computer readable instructions running on a processor, or a suitable combination thereof. Although wireless communication interface 108 may be implemented in a variety of suitable manners, in an exemplary embodiment, wireless communication interface 108 may be implemented as a Bluetooth low energy device including a communication interface, processing unit, memory, and transmission circuitry.

Wired communication interface 110 may include a suitable interface for wired communication with other devices or a communication network, such as USB, Lightning, FireWire, Ethernet, any other suitable wired communication interface, or any combination thereof. In some embodiments, wired communication interface 110 may allow payment reader to communicate with one or both of merchant device 29 and payment server 40.

Payment reader 22 may provide an appealing target for an attacker, since, as described above, it provides a central point for receiving payment via multiple interfaces and for communicating that information with other devices (e.g., merchant device 29). Attackers may attempt to tamper with payment reader 22 in order to access internal information stored at the payment reader, to engage in spoofed communications with the payment reader, or to process fraudulent transactions by the payment reader. One method for attackers may be to employ glitch attacks to one or more of the general processing unit 120 or the cryptographic processing unit 125 (e.g., by applying repeatedly or in patterns a short low-voltage glitch to the processor power supply). Accordingly, payment reader 22 may include numerous mechanisms for monitoring, mitigating, and preventing attempts to tamper with payment reader 22, such as detection circuitry association with power conversion circuitry 116 and instructions executed by general processing unit 120 and/or cryptographic processing unit 125 (e.g., based on glitch instructions 136, exception handling instructions 138, bootloader instructions 140, and glitch instructions 176).

In some embodiments, general memory 122 may be a suitable memory as described herein, and may include a plurality of sets of instructions for controlling operations of payment reader 22 and performing general transaction processing operations of payment reader 22, such as operating instructions 130, transaction processing instructions 132, data authentication instructions 134, glitch instructions 136, exception handling instructions 138, and bootloader instructions 140.

Operating instructions 130 may include instructions for controlling general operations of the payment reader 22, such as internal communications, power management, processing of messages, system monitoring, sleep modes, user interface response and control, operation of the contact interface 104, the wireless interface 108, the wired interface 110, or the signal conditioning device 112, and the management of the other sets of instructions. In one embodiment, the operating instructions 130 may provide the operating system and applications necessary to perform most of the processing operations that are performed by the processing unit 120 of the reader chip 100 of payment reader 22.

Operating instructions 130 may also include instructions for interacting with a merchant device 29. In one embodiment, the merchant device 29 may be running a point-of-sale application. The operating instructions 130 may include instructions for a complementary application to run on processing unit 120 of reader chip 100, in order to exchange information with the point-of-sale application. For example, the point-of-sale application may provide a user interface that facilitates a user such as a merchant to engage in purchase transactions with a customer. Menus may provide for the selection of items, calculation of taxes, addition of tips, and other related functionality. When it is time to receive payment, the point-of-sale application may send a message to the payment reader 22 (e.g., via wireless interface 108). The operating instructions 130 facilitate processing of the payment, for example, by acquiring payment information via the contactless interface 102 or contact interface 104, and invoking the various resources of reader chip 100 to process that payment information (e.g., by executing memories stored in cryptographic memory 128 using cryptographic processing unit 125), and by generating responsive messages that are transmitted to the point-of-sale application of the merchant device 29 via wireless communication interface 108 and wired communication interface 110.

Operating instructions 130 may also include instructions for interacting with a payment service system 50 at a payment server 40. In one embodiment, a payment service system 50 may be associated with the payment reader 22 and the point-of-sale application of the merchant device 29. For example, the payment service system 50 may have information about payment readers 22 and merchant devices 29 that are registered with the payment service system 50 (e.g., based on unique identifiers). This information may be used to process transactions with servers of the merchant and customer financial institutions, for providing analysis and reports to a merchant, and aggregating transaction data. The payment reader 22 may process payment information (e.g., based on operation of reader chip 100) and communicate the processed payment information to the point-of-sale application, which in turn communicates with the payment service system 50. In this manner, messages from the payment reader 22 may be forwarded to the payment service system 50 of payment server 40, such that the payment reader 22 and payment service system 50 may collectively process the payment transaction.

Transaction processing instructions 132 may include instructions for controlling general transaction processing operations of the payment reader 22, such as controlling the interaction between the payment reader 22 and a payment device 10 (e.g., for interfacing with a payment device via the contactless interface 102 and contact interface 104), selecting payment processing procedures (e.g., based on a payment processing entity associated with a payment method), interfacing with the cryptographic processor 125, and any other suitable aspects of transaction processing.

Transaction processing instructions 132 also may include instructions for processing payment transactions at payment reader 22. In one embodiment, the transaction processing instructions may be compliant with a payment standard such as those promulgated by EMV. Depending on the payment method that is being used (e.g., Europay, Mastercard, Visa, American Express, etc.), a particular processing procedure associated with the payment method may be selected and the transaction may be processed according to that procedure. When executed by processing unit 120, these instructions may determine whether to process a transaction locally, how payment information is accessed from a payment device, how that payment information is processed, which cryptographic functions to perform, the types of communications to exchange with a payment server, and any other suitable information related to the processing of payment transactions. In some embodiments, transaction processing instructions 132 may perform high level processing, and provide instructions for processing unit 120 to communicate with cryptographic processing unit 125 to perform most transaction processing operations. In addition, transaction processing instructions 132 may provide instructions for acquiring suitable information from a chip card (e.g., via contact interface 104 and cryptographic processing unit 125) such as authorization responses, card user name, card expiration, etc.

Data authentication instructions 134 may include instructions for providing configuration information for a payment terminal 20. The configuration information may include suitable information, such as payment limits and types of transactions for local transactions (i.e., transactions that occur without contacting a payment server 40) and supported applications. As an example, in some embodiments, data authentication instructions 134 may include configuration instructions such as TMS-CAPK instructions. In some embodiments, the TMS-CAPK may be tailored for a particular jurisdiction (e.g., country-specific).

Exception handling instructions 138 may include instructions for identifying, processing, and reporting exceptions that occur during the execution of instructions from memory 122 by processing unit 120. Although in an exemplary embodiment the exception handling instructions 138 will be described as being stored in memory 122 and executed by processing unit 120, some or all of exception handling instructions 138 may be stored in cryptographic memory 128 and executed by cryptographic processing unit 125. Moreover, some or all of exception handling instructions 138 may be executed by both of general processing unit 120 and cryptographic processing unit 125.

Exception handling instructions may identify instances in which the normal flow of execution of programs by one of the processing units creates an exceptional or anomalous result such as divide by zero, invalid values, execution of anomalous code, or other such circumstances. In an exemplary embodiment, exception handling instructions 138 may provide some are all of the exceptions for storage in battery-backed memory 114 as glitch values, and in some embodiments, also provide information related to the exceptions such as an identifier of an exception type. In some embodiments, exception handling instructions 138 may identify only selected exception types or circumstances for storage in battery-backed memory 114 based on a likelihood that the particular exception is related to a glitch and/or based on particular programs (e.g., a bootloader 140) that are likely to experience a glitch attack (e.g., at device startup).

Glitch instructions 136 may provide instructions for the identification and processing of possible glitches. Although in an exemplary embodiment the glitch instructions 136 will be described as being stored in memory 122 and executed by processing unit 120, some or all of glitch instructions 136 may be stored in cryptographic memory 128 and executed by cryptographic processing unit 125. Moreover, some or all of glitch instructions 136 may be executed by both of general processing unit 120 and cryptographic processing unit 125. Glitch instructions may be executed during some or all stages of processing performed by processing units of the reader chip, such as during a boot process performed by executing bootloader instructions 140. In an exemplary embodiment, glitch instructions 136 may be executed prior to executing other bootloader instructions 140 or during an early stage of the boot process of bootloader instructions 140. However, it will be understood that glitch instructions may be executed at other suitable times, such as periodically during operation of the processing units.

In some embodiments, glitch instructions 136 may provide instruction to access glitch values from a memory such as battery-backed memory 114. As described herein, glitch values may include information that is related to glitches, such as glitch data (e.g., a glitch indicator generated by glitch monitoring circuitry of power conversion circuitry 116, exception counts, exception identifiers) as well as glitch processing control information. Glitch processing control information may include information such as test criteria, scaling factors, and types of corrective action to be employed during glitch processing. Exemplary test criteria may include thresholds may include thresholds related to a determination to take corrective action, such as a threshold for a number of exceptions that have occurred or an exception score (e.g., by weighting exceptions with exception types) threshold. In some embodiments, different exceptions may be associated with different levels of corrective action. Exemplary scaling factors may be values that control aspects of corrective action, such as multipliers for weighted types of correction, such as delay values or modifications to a reference voltage for the power conversion circuitry 116. Exemplary types of corrective action may include associations between particular corrective actions and the test criteria and/or scaling factors, with corrective actions including delaying processing, modifying sequences of code execution, entering a safe mode where only limited portions of code are executed, providing reporting of a possible glitch attack to external devices (e.g., a payment server 40 or a merchant terminal 29), disabling the operation of one or more processes or components of the payment reader 22, disabling encryption keys, other suitable corrective actions, and combinations thereof. Any such corrective action may be tiered such that the identification of a potential glitch under more severe test criteria may result in more severe types of corrective action. In some embodiments, the glitch values may be stored in a minimal number of dedicated memory locations of the battery-backed memory 114, such that all of the information needed to perform glitch processing may be quickly accessed from the battery-backed memory 114 (e.g., during execution of bootloader 140). In some embodiments, some or all of the glitch processing information may be stored separately from the other glitch values (e.g., other glitch processing information or glitch data) or may be implemented as part of executed code (e.g., of bootloader 140).

Glitch instructions 136 may also provide instructions for implementing corrective action in response to a determination that one or more of the glitch criteria has been satisfied by the glitch data based on the scaling factors, if any. The corrective action that is associated with each of the glitch criteria may be accessed and executed. In an exemplary embodiment of a glitch indicator generated by monitoring circuitry, the assertion of the glitch indicator may result in a particular corrective action (e.g., a reporting communication to a payment server 40 and disabling of one or more processes or components of the payment reader 22). A glitch indicator counter may be incremented with each subsequent generation of a glitch indicator (and in some embodiments, decremented, e.g., on a periodic basis or based on completion of predetermined conditions) and more severe corrective action may be taken based on higher glitch indicator count values.

In another exemplary embodiment, an exception count may be utilized to select between multiple types of corrective action. In an exemplary embodiment, glitch values stored in battery-backed memory 114 may include an exception count, an indicator of the most recent exception, an exception limit, and a delay scaling factor. For example, battery-backed memory 114 may include four bytes of dedicated memory including a first byte for the exception count, a second byte for the exception indicator, a third byte for the exception limit, and a fourth byte for the delay scaling factor. Glitch instructions 136 may be executed at the beginning of the boot process, before a significant number of bootloader instructions 140 have been executed. Glitch instructions 136 may first compare the exception count to the exception limit. If the exception count exceeds the exception limit, then a severe mitigation technique such as cryptographic key erasure may be caused by glitch instructions. In some embodiments, the exception limit may be scaled based on the exception id (e.g., an exception type associated with a more severe glitch attack may be more likely to cause immediate key erasure). If the exception limit is not breached, the exception count may be multiplied by the delay scaling factor, to implement a delay in the boot process (i.e., a less severe technique than erasure of encryption keys). Providing the delay may make it more difficult for an attacker to perform the glitch attack at the proper time. In some embodiments, the delay may be modified based on a randomly generated number. Once the delay has expired, the remainder of the bootloader instructions may be executed.

Bootloader 140 may include instructions that are executed during a boot process of the reader device. Although in an exemplary embodiment the bootloader instructions 14—will be described as being stored in memory 122 and executed by processing unit 120, some or all of bootloader instructions 140 may be stored in cryptographic memory 128 and executed by cryptographic processing unit 125. Moreover, some or all of bootloader instructions 138 may be executed by both of general processing unit 120 and cryptographic processing unit 125. Bootloader instructions may be instructions that may not be updateable or may be extremely difficult to update, and that may executer during a boot process in order to initiate other processes of the reader chip 100. In an exemplary embodiment, at least a portion of glitch instructions 136 may be implemented within bootloader instructions 140 at or near the beginning of the bootloader instructions. Because the glitch instructions 136 access glitch processing control information stored elsewhere (e.g., in battery-backed memory 114) it may be possible to "update" aspects of the operation of the glitch instructions 136 within the bootloader 140 without modifying the code of the bootloader 140. Moreover, the glitch instructions may be optimized to utilize minimal storage space within the bootloader because relevant glitch processing information is accessible from the battery-backed memory 114.

In an embodiment, the instructions store in memory 122, memory 128, and/or bootloader 140 may be modified to implement glitch avoidance instructions. As described herein, glitches on the processing unit power supply may result in glitches such as the skipping of instructions. Glitch avoidance instructions may provide redundancy and/or countermeasures that limit the ability of such skipping of instructions from causing exceptions. In some embodiments, glitch avoidance instructions may be optional and may be utilized only after the occurrence of a glitch condition (e.g., switching to glitch avoidance instructions may be an available type of corrective action). In some exemplary embodiments, glitch avoidance instructions may include intentionally inserted code and delays (e.g., random delays), or a combination thereof. For example, illegal code can be inserted that can only be reached if instructions are skipped, insertion of delays (e.g., random delays) in portions of code that are likely to occur during glitch attempts to avoid skipping, duplication of branch and compare constructions that are most likely to result in exceptions or tamper-sensitive conditions (e.g., including introduction of random delays), duplicating hash comparisons (e.g., including introduction of random delays), repeating signature verification operations (e.g., including introduction of random delays), repeating critical cryptographic operations (e.g., including introduction of random delays), and other related introductions of redundancy and unpredictability to code execution. In an embodiment, a glitch avoidance compiler can be used to introduce glitches into standard code formats.

Cryptographic processing unit 125 may be a suitable a processor as described herein, and, in some embodiments, may perform cryptographic functions for the processing of payment transactions. For example, in some embodiments a cryptographic processing unit 125 may encrypt and decrypt data based on one or more encryption keys, in a manner that isolates the encryption functionality from other components of payment reader 22 and protects the encryption keys from being exposed to other components of payment reader 22.

In some embodiments, cryptographic memory 128 may be a suitable memory or combination thereof as described herein, and may include a plurality of sets of instructions for performing cryptographic operations, such as payment processing instructions 172, cryptographic instructions 174, and glitch instructions 176. Payment processing instructions 172 may include instructions for performing aspects of payment processing, such as providing for encryption techniques to be used in association with particular payment procedures, accessing account and processing information, any other suitable payment processing functionality, or a suitable combination thereof. Cryptographic instructions 174 may include instructions for performing cryptographic operations. Cryptographic processing unit 125 may execute the cryptographic instructions 174 to perform a variety of cryptographic functions, such as to encrypt, decrypt, sign, or verify a signature upon payment and transaction information as part of a payment transaction.

Glitch key instructions 176 may include instructions for processing the erasure of keys in response to the identification of a glitch on the processing unit power supply and a corrective action that requires key erasure (e.g., including deletion, changing of key values, etc.). Although in an exemplary embodiment the glitch key instructions 176 will be described as being stored in cryptographic memory 128 and executed by cryptographic processing unit 125, some or all of glitch key instructions 176 may be stored in memory 121 and executed by processing unit 120. Moreover, some or all of glitch key instructions 176 may be executed by both of general processing unit 120 and cryptographic processing unit 125. Glitch key instructions 176 may be responsive to glitch instructions 136 determining that a corrective action of key erasure needs to occur. In some embodiments, glitch key instructions 176 may receive a request to erase a particular key or keys. In some embodiments, glitch key instructions 176 may select one or more keys to erase based on a desired result (e.g., to maintain the ability to communicate with a payment server 40 but not to encrypt payment information.

Figure 4:
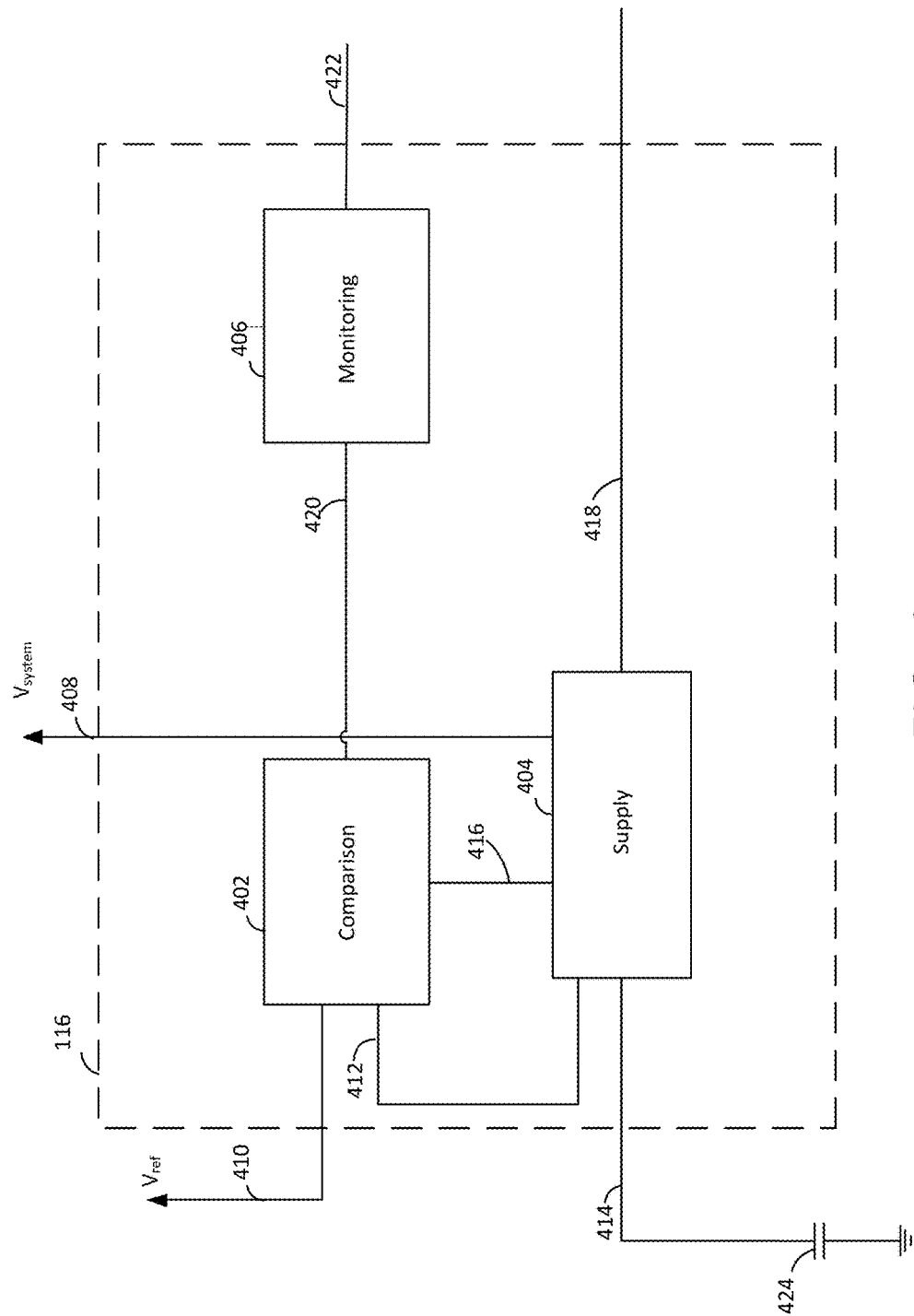
FIG. 4 depicts an exemplary power conversion circuit in accordance with some embodiments of the present disclosure.

FIG. 4 depicts an exemplary power conversion circuit 116 in accordance with some embodiments of the present disclosure. Although the power conversion circuit 116 is depicted as including particular components in FIG. 4, it will be understood that power conversion circuit 116 may include additional components, one or more of the components of power conversion circuit 116 may be replaced, and one or more of the components of power conversion circuit 116 may be removed in some embodiments, while still performing some or all of the functionality of the power conversion circuitry 116 as described herein. In an exemplary embodiment, power conversion circuitry 116 may include a comparison circuit 402, a supply circuit 404, and a monitoring circuit 406. An exemplary power conversion circuit 116 may have a number of inputs and outputs in an exemplary embodiment, such as a reference voltage (Vref) input 410, a power source input 408 having a source voltage $V_{source}$, a filtering input 414 coupled to a filtering component such as a capacitor 424, a processing unit source output 418, and a glitch output 422. Although any of the inputs or outputs may be provided by circuitry within reader chip 100 or circuitry external to reader chip 100, in an exemplary embodiment the power source input 408 and filtering input 414 may originate from sources external to reader chip 100 and may be provided to power conversion circuit 116 via one or more terminals of reader chip 100, while reference voltage input 410, processing unit supply output 418, and glitch output may be coupled to other components of reader chip 100.

An exemplary comparison circuit 402 may receive the reference voltage via the reference voltage input 410 as well as a processing unit voltage feedback signal via feedback input 412. In some embodiments, the reference voltage may be generated by suitable components such as diodes, resistors, switches, and current sources (e.g., in some embodiments, temperature and environment independent components) that output a consistent reference voltage that corresponds to (e.g., is identical to or proportional to) a desired processing unit power source voltage. In some embodiments, the reference voltage may be modifiable (e.g., by processing unit 120) to optimize the processing unit power source voltage for different operating conditions such as low power conditions, high-speed processing conditions, etc. An exemplary processing unit voltage feedback signal may provide a signal (e.g., a voltage) that corresponds to (e.g., is identical to or proportional to) an actual voltage that is being provided by the processing unit power supply via output 418.

Comparison circuit 402 may compare the receive reference voltage and feedback signals to generate a control signal that is output to supply circuit 404 via control connection 416. In some embodiments, comparison circuit 402 may include circuitry such as comparators, differential amplifiers, filtering circuitry, and other components (e.g., implemented as discrete circuitry or including digital processing) to perform a comparison of the reference voltage and the feedback signal. The control signal that is output based on the comparison may be a suitable control signal for causing the supply circuit 404 to adjust the voltage of the processing unit power supply to correspond to the reference voltage (e.g., a gate input to a transistor that sources current from the power source input 408). In an embodiment, the comparison signal or an intermediate signal that is corresponds to the difference between the reference and feedback voltages (e.g., a signal representative of the control voltage) may be provided as a monitoring signal to the monitoring circuit 406 via monitoring connection.

An exemplary supply circuit 404 may receive the control signal via control connection 416 and may be coupled to the power source input 408 and filtering input 414. The supply circuit may utilize the control signal to control the provision of power (e.g., via supply of current) from the power source input 408. In an embodiment, supply circuit 404 may be implemented with circuitry (e.g., one or more transistors such as a PMOS transistor) that allows power (e.g., supplied as a current) to be selectively provided from the power source input 408 to modify the voltage that is output via processing unit supply output 418. Filtering input 414 and internal filtering circuitry (e.g., forming R-C and other filters) may provide suitable filtering such that a processing unit power supply signal provided via processing unit supply output 418 has suitable signal characteristics such as reduced noise, harmonics, and power spikes. Feedback connection 412 may provide a path for a signal representative of the processing unit power supply voltage (e.g., a processing unit power supply voltage that is equal to or proportional to the processing unit power supply voltage) to be provided to comparison circuit 402.

An exemplary monitoring circuit 406 may receive the monitoring signal that corresponds to the difference between the reference and feedback voltages via monitoring connection 420 and output a glitch indicator via glitch output 422 based on the monitoring signal. Although not depicted in FIG. 4, in some embodiments, the monitoring circuit may receive additional signal inputs that provide information that may be relevant to a glitch such as monitoring signals from components and terminals that are likely to be used by an attacker to effectuate a glitch attack, such as measured values (voltage, current, capacitance, etc.) from terminals associated with filtering input 414 (e.g., which may be coupled to a capacitor 424 that is external to reader chip 100 via a terminal), power source input 408 (e.g., which may be coupled to a power source that is external to reader chip 100 via a terminal), and processing unit power source output 418 (which may be directly indicative of the processing unit power supply voltage). The monitoring circuit may compare the received signals to test criteria, which may be implemented as discrete circuitry, with processing circuitry, or combination thereof. In exemplary embodiments the values of received signals may be compared to thresholds for signal characteristics such as magnitude, slope, noise, and other characteristics that may be known to correspond to glitch attacks. If the test criteria indicate that a glitch may have occurred, a glitch indicator may be generated. The glitch indicator can indicate the presence of a possible glitch attack, and in some embodiments, may include information describing a glitch type and or severity. The glitch indicator may be stored within monitoring circuitry 406 and output via glitch output to components such as batter-backed RAM 114 and processing unit 120.

Figure 5:
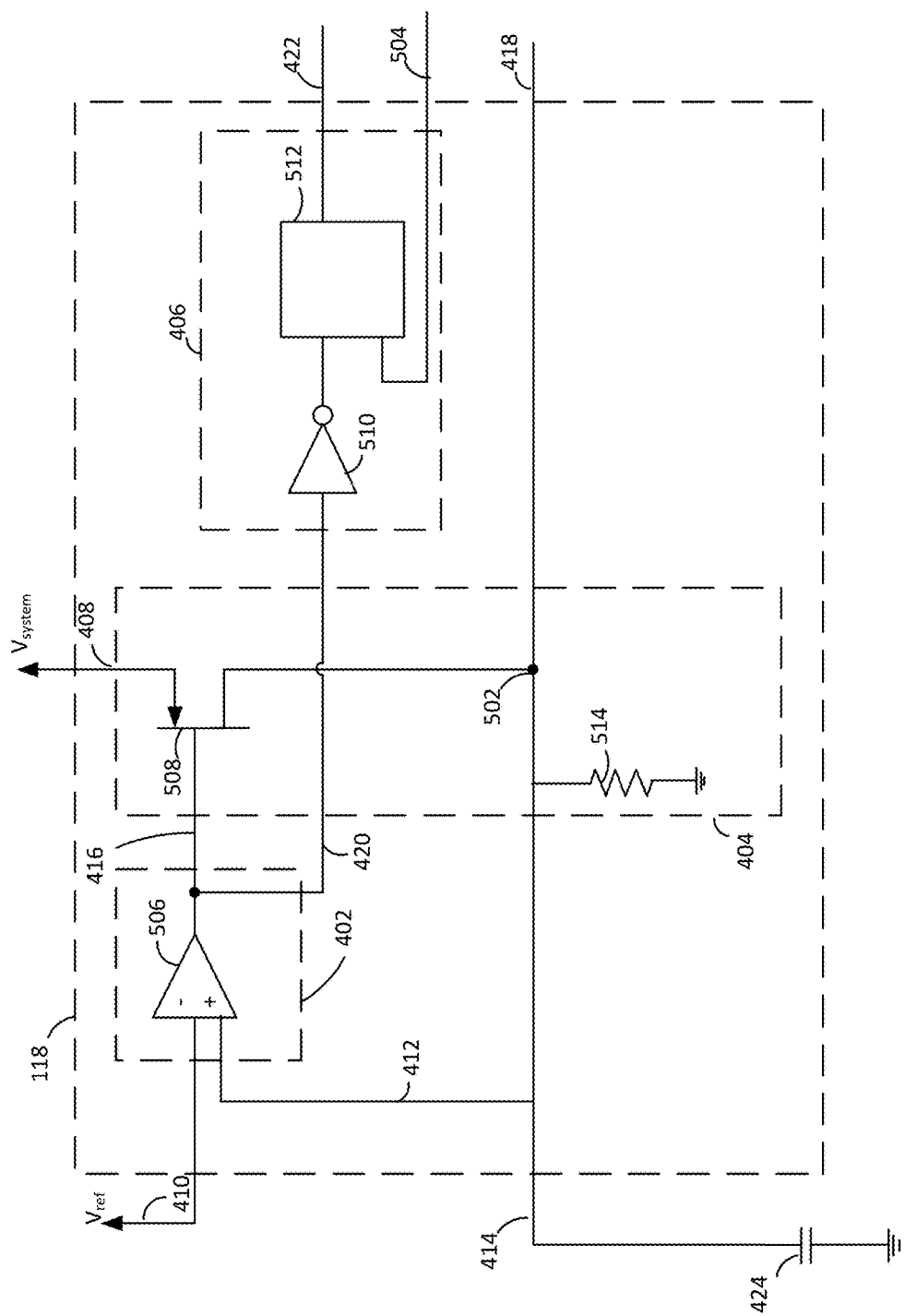
FIG. 5 depicts exemplary circuitry of an exemplary power conversion circuit in accordance with some embodiments of the present disclosure.

FIG. 5 depicts exemplary circuitry of an exemplary power conversion circuit 116 of FIG. 4 in accordance with some embodiments of the present disclosure, and includes the components, inputs, outputs, and connections thereof. Although particular circuitry is depicted as being associated with particular components of power conversion circuit in FIG. 5, it will be understood that each component of power conversion circuit 116 may include additional circuitry, a portion of the circuitry of the components of power conversion circuit 116 may be replaced, and a portion of the circuitry of one or more of the components of power conversion circuit 116 may be removed in some embodiments, while still performing some or all of the functionality of the components of power conversion circuitry 116 as described herein.

In an exemplary embodiment, comparison circuit may include a differential amplifier 506 having the reference voltage coupled to a first (−) differential input and the feedback voltage coupled to the second (+) input. It will be understood that the input signals may be swapped depending on the implementation of the supply circuitry 404 and a desired output signal, and further, that the input signals may be modified in a suitable manner (e.g., filtering, scaling, etc.) before being provided to the differential amplifier. Although not specifically depicted in FIG. 5, it will be understood that rails of differential amplifier 506 may be coupled to suitable sources, may include feedback components, and may include output filtering and scaling. In some embodiments, the output of differential amplifier 506 is proportional to the difference between the reference voltage and the feedback voltage, such that the output voltage of the differential amplifier increases as the difference between the reference voltage and the feedback voltage increases. In the exemplary embodiment of FIG. 5, the output of the differential amplifier 506 is provided as the control signal to supply circuit 404 via control connection 416 and as the monitoring signal to monitoring circuit 406 via monitoring connection 420.

In some embodiments, supply circuit may comprise a transistor such as a PMOS transistor 508, one or more filtering components such as resistor 514, and a processing unit power supply node 502. The control signal received via control connection 416 (or in some embodiments, a signal representative thereof) may be provided to the gate of PMOS transistor 508, the system power supply (or in some embodiments, a signal representative thereof) may be provided to the source of PMOS transistor 508 from power source input 408, and the drain of PMOS transistor 508 may be provided to processing unit power supply node 502. Current supplied to the processing unit power supply node 502 and filtering circuitry connected thereto (e.g., parallel capacitor 424 and resistor 514) may be controlled by the control signal provided to the gate of PMOS transistor 508.

In some embodiments, monitoring circuit may comprise an inverter 510 that is coupled to receive the monitoring signal via the monitoring connection 420. The inverter 510 may have a threshold that corresponds to a glitch threshold. In the exemplary embodiment of FIG. 5, under normal operating conditions the voltage of the monitoring signal may be greater than the inverter 510 threshold if a low-voltage glitch attack is to be detected or less than the inverter threshold if a high-voltage glitch attack is to be detected. In an embodiment where both a high-voltage and low-voltage glitch attack are being monitored, multiple inverters 510 with appropriate logic may be implemented. When the voltage of the monitoring signal crosses the inverter 510 threshold the output of the inverter changes to voltage associated with a different logic level, and in an embodiment, is provided to a storage element 512. In an embodiment, storage element 512 (e.g., a latch, a counter, a memory, or other storage element) may store the output of the inverter 510 or inverters 510 whenever the output of the inverter crosses the glitch threshold (e.g., providing a glitch indicator). In some embodiments, the glitch indicator may be stored (and in some embodiments, incremented) until a signal such as a reset signal is received (e.g., via reset input 504) from an external component such as a processing unit 120 that has read the glitch indicator via glitch output 422 or caused the glitch indicator output to be provided to the battery-backed memory 114.

In view of the structures and devices described supra, methods that can be implemented in accordance with the disclosed subject matter will be better appreciated with reference to the flowcharts of FIGS. 6-9. While, for purposes of simplicity of explanation, the methods are shown and described as a series of steps, it is to be understood and appreciated that such illustrations or corresponding descriptions are not limited by the order of the steps, as some steps may occur in different orders and/or concurrently with other steps from what is depicted and described herein. Any non-sequential, or branched, flow illustrated via a flowchart should be understood to indicate that various other branches, flow paths, and orders of the steps, can be implemented which achieve the same or a similar result. Moreover, not all illustrated steps may be required to implement the methods described hereinafter.

Figure 6:
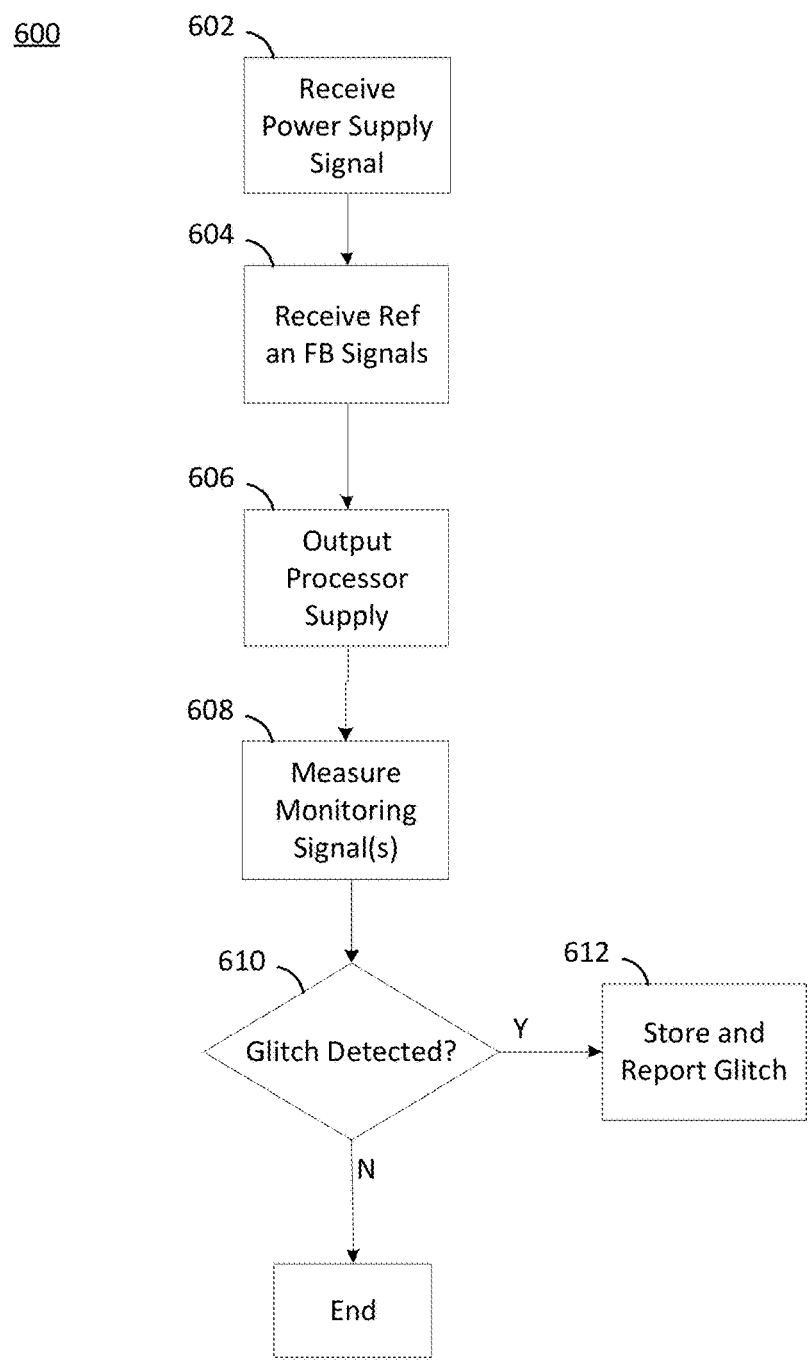
FIG. 6 depicts a non-limiting flow diagram illustrating exemplary methods for performing glitch detection in accordance with some embodiments of the present disclosure.

FIG. 6 depicts a non-limiting flow diagram illustrating exemplary methods for performing glitch detection (e.g., by power conversion circuitry 116) in accordance with some embodiments of the present disclosure. At step 602, a power supply signal may be received. The power supply signal may be provided from a suitable signal source that is capable of sourcing the necessary power for generating a processing unit power source with appropriate signal characteristics (e.g., minimal noise, power spikes, etc.). Once the power supply signal is received, processing may continue to step 604.

At step 604, a voltage reference signal and a processing unit power supply feedback signal may be received. A control signal for providing power from the provided power supply signal to the processing unit power supply may be generated based on the difference between the reference signal and the feedback signal in order to match the feedback signal to the reference signal. A monitoring signal may also be generated based on the control signal. Under normal operating conditions, the feedback voltage should remain relatively similar to the reference signal (e.g., under normal loading conditions the control signal should compensate for changes to the feedback signal prior to experiencing severe changes in the feedback signal). In the case of a glitch attack, the monitoring signal may experience significant change (e.g., increase or decrease) that may be utilized to identify a glitch. Processing may then continue to step 606.

At step 606, the processing unit power supply may be generated based on the control signal. In an embodiment, a current supplied from the power supply signal may be increased or decreased based on the control signal. The supply current may be filtered based on filtering components, and provided to the processing unit and other circuitry (e.g., memory of the reader chip) from a processing unit power supply node. Processing may then continue to step 608.

At step 608, one or more monitoring signals (e.g., based on the control signal and/or other signals as described herein) may be processed, for example, by comparisons of magnitude, slope, noise, and other signal characteristics to thresholds or other analysis rules. In some embodiments, multiple monitoring signals may be analyzed together (e.g., to identify correlations that are related to a glitch, such as a change in capacitance at a terminal and a change in control voltage) to determine whether a glitch exists. Once the glitch analysis has been performed, processing may continue to step 610, at which it may be determined whether a glitch has been identified. If a glitch has been not been identified, the processing of FIG. 6 may end. If a glitch has been identified, processing may continue to step 612.

At step 612, a glitch indicator may be stored and reported. In some embodiments, a glitch will have a limited duration. Accordingly, a storage component may store the existence of a glitch and in some embodiments may maintain a running count of glitches. A glitch indicator may be generated that may indicate that the glitch has occurred, and in some embodiments, may provide information about a glitch such as a glitch source or severity. The glitch indicator may be accessed by components such as a processing unit and may be provided to memory (e.g., a battery-backed memory) for storage.

Figure 7:
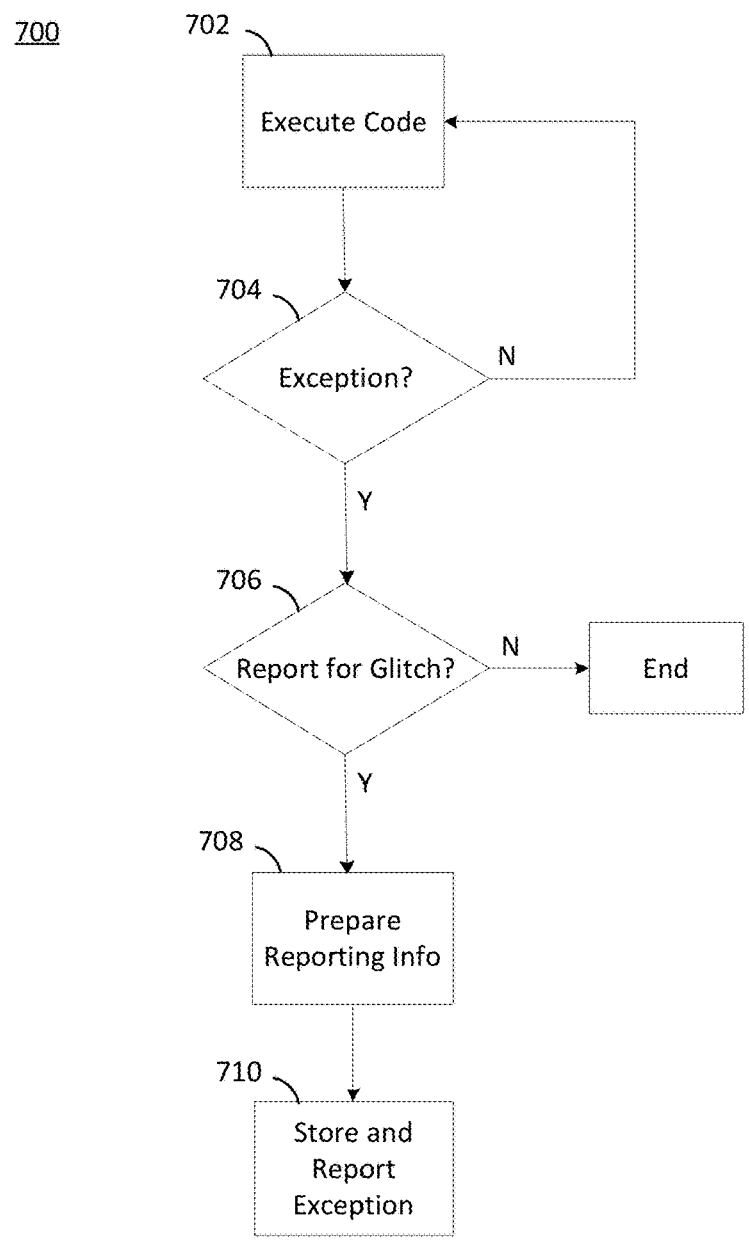
FIG. 7 depicts a non-limiting flow diagram illustrating exemplary methods of exception monitoring in accordance with some embodiments of the present disclosure.

FIG. 7 depicts a non-limiting flow diagram illustrating exemplary methods of exception monitoring (e.g., by exception handling instructions 138) in accordance with some embodiments of the present disclosure. At step 702, a processing unit may execute code such as an operating system, application, or routine. The exception handler may execute in the background to process the occurrence of exceptions, such as such as divide by zero, invalid values, execution of anomalous code, or other such circumstances. Processing may continue to step 704, for the exception handler to determine whether an exception has occurred. If an exception has not occurred, processing may return to step 702 to continue executing code and monitoring for exceptions. If an exception is detected, processing may continue to step 706.

At step 706 it may be determined whether the exception should be reported for analysis for glitch detection. In some embodiments, exceptions may only be monitored for glitch detection purposes during certain portions of code associated with particular operations, such as during boot, NFC communications, chip card communications, or payment processing. In some embodiments, only certain types of exceptions (e.g., divide by zero and anomalous code execution sequences) may be determined to be relevant to the occurrence of glitches. If a particular exception is determined not to be relevant to glitches, processing of the exception (e.g., with respect to glitch detection and mitigation) may end. If the exception is relevant to glitches, processing may continue to step 708.

At step 708, reporting information may be determined for the exception. Reporting information may include an identifier for the type of exception, an identification of a portion of code that was executing when the exception occurred, a severity indicator for the exception, and other related information. In some embodiments, other information may be gathered such as external information related to the occurrence of the exception (e.g., measurement values, input states, output states, and other operating characteristics). Once the reporting information is gathered, processing may continue to step 710, at which the exception information is stored. In an exemplary embodiment, the exception information may be stored in a dedicated location in a battery-backed memory (e.g., as an exception count and an exception identifier).

Figure 8:
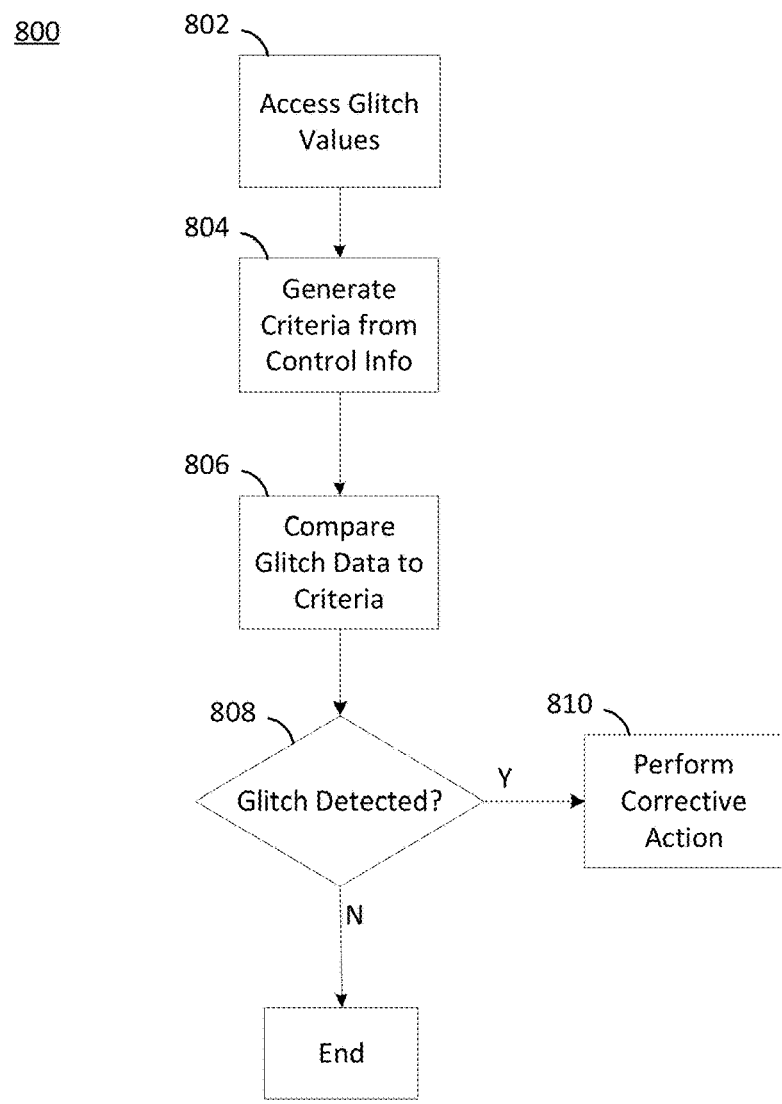
FIG. 8 depicts a non-limiting flow diagram illustrating exemplary methods of bootloader glitch monitoring in accordance with some embodiments of the present disclosure.

FIG. 8 depicts a non-limiting flow diagram illustrating exemplary methods of glitch monitoring (e.g., by glitch instructions 136) in accordance with some embodiments of the present disclosure. At step 802, glitch values may be accessed from memory such as a battery-backed memory. In an exemplary embodiment, the glitch values may include stored glitch data and glitch processing control information. Once the glitch values are obtained, processing may continue to step 804.

At step 804, glitch detection criteria may be generated based on the glitch processing control information and other data or information (e.g., of glitch instructions 136). Exemplary glitch criteria may indicate glitch tests to perform (e.g., exception testing, testing of glitch indicators, monitoring of other glitch-related inputs, and combinations thereof), thresholds, statistical analyses, corrective action responses, delay values, scaling factors, and other similar information. Once the test criteria are generated, processing may continue to step 806.

At step 806, the glitch data may be compared to the glitch criteria to determine whether one or more of the glitch criteria are satisfied. If one or more of the glitch criteria are satisfied (e.g., a monitoring circuit of a power conversion circuit has generated a glitch indicator, or a number of exceptions exceeds an exception threshold), a possible glitch may be detected at step 808 and processing may continue to step 810. If no glitch criteria have been detected, the glitch detection processing of FIG. 8 may end.

At step 810, a corrective action may be performed based on the glitch criteria that are satisfied. Corrective actions may include delaying processing, modifying sequences of code execution, entering a safe mode where only limited portions of code are executed, providing reporting of a possible glitch attack to external devices (e.g., a payment server 40 or a merchant terminal 29), disabling the operation of one or more processes or components of the payment reader 22, disabling encryption keys, other suitable corrective actions, and combinations thereof. Once the corrective action has been performed the processing of FIG. 8 may end.

Figure 9:
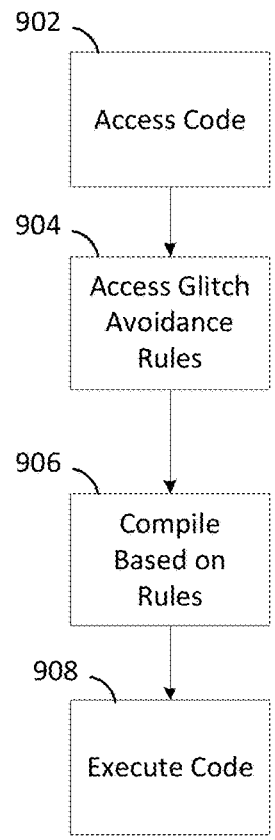
FIG. 9 depicts a non-limiting flow diagram illustrating exemplary methods of pre-emptive glitch prevention in accordance with some embodiments of the present disclosure.

FIG. 9 depicts a non-limiting flow diagram illustrating exemplary methods of pre-emptive glitch prevention in accordance with some embodiments of the present disclosure. The steps of FIG. 9 may be performed locally at a device such as a payment reader, or in some embodiments, at a remote server or computer. At step 902, code for execution (e.g., by one or more processing units of a payment reader) may be received in a format that is not executable, such as source or object code. It may be desired to utilize the code for execution at a local device that is subject to glitch attacks. Once the code is received, processing may continue to step 904.

At step 904, one or more glitch avoidance rules may be accessed. Glitch avoidance rules may define types of operations, code structures, routines, instructions, and other aspects of code execution that may be vulnerable to glitch attacks. The glitch avoidance rules may also define countermeasures that may be employed to prevent or mitigate the glitch attack, such insertion of illegal code that can only be reached if instructions are skipped, insertion of delays (e.g., random delays) in portions of code that are likely to occur during glitch attempts to avoid skipping, duplication of branch and compare constructions that are most likely to result in exceptions or tamper-sensitive conditions (e.g., including introduction of random delays), duplicating hash comparisons (e.g., including introduction of random delays), repeating signature verification operations (e.g., including introduction of random delays), repeating critical cryptographic operations (e.g., including introduction of random delays), and other related introductions of redundancy and unpredictability to code execution. Once the glitch avoidance rules have been accessed, processing may continue to step 906.

At step 906, the received code may be compiled based on the glitch avoidance rules. Countermeasures may be inserted into portions of code that are vulnerable to glitch attacks, and the executable code may be generated to include the countermeasures. Once the executable code is generated, the code may be executed at step 908.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A payment reader configured to detect and mitigate the occurrence of glitches during execution of bootloader instructions of the payment reader, comprising:
   at least one bootloader memory, the bootloader memory comprising glitch instructions and bootloader instructions;
   at least one battery-backed memory, the battery-backed memory comprising storage for an exception count, an exception limit, and a delay value;
   at least one processing unit, wherein the at least one processing unit executes the glitch instructions on a startup of the payment reader, and wherein the glitch instructions cause the at least one processing unit to:
      access the exception count and the exception limit from the battery-backed memory, determine whether the exception count exceeds the exception limit,
      disable a cryptographic key when the exception count exceeds the exception limit, identify, when the exception count does not exceed the exception limit, a delay based on the exception count and the delay value, and
      execute, after the delay, the bootloader instructions, wherein the processor is configured to identify an exception during execution of the bootloader instructions, and to increment the exception count when the exception is identified.

2. The payment reader of claim 1, wherein the battery-backed memory comprises an exception indicator associated with one or more exceptions of the exception count.

3. The payment reader of claim 2, wherein the glitch instructions cause the at least one processing unit to access the exception indicator from the battery-backed memory, and wherein the delay is based on the exception indicator.

4. The payment reader of claim 1, wherein the battery-backed memory comprises a glitch indicator, wherein the glitch indicator is received from a monitoring circuit when the monitoring circuit identifies a glitch on a processing unit power supply, and wherein the glitch instructions cause the at least one processing unit to disable the cryptographic key when the glitch indicator is stored at the battery-backed memory.

5. A transaction device including power supply glitch mitigation, the transaction device comprising:
   at least one bootloader memory, the bootloader memory comprising glitch instructions and bootloader instructions;
   at least one persistent memory, the persistent memory comprising storage for one or more glitch values;
   at least one processing unit, wherein the at least one processing unit executes the glitch instructions prior to executing the bootloader instructions, and wherein the glitch instructions cause the at least one processing unit to:

access the one or more glitch values from the persistent memory, determine whether the one or more glitch values satisfy a first glitch criteria;

disable one or more operations of the transaction device when the one or more glitch values satisfy the first glitch criteria;

determine whether the one or more glitch values satisfy a second glitch criteria;

identify a delay when the glitch values satisfy the second glitch criteria; and execute, after the delay, the bootloader instructions.

6. The transaction device of claim 5, wherein a glitch indicator is received at the persistent memory as one of the one or more glitch values from a monitoring circuit when the monitoring circuit identifies a glitch on a processing unit power supply, and wherein the glitch instructions cause the at least one processing unit to disable the one or more operations of the transaction device when the glitch indicator is stored as one of the one or more glitch values.

7. The transaction device of claim 5, wherein the persistent memory comprises a battery-backed memory.

8. The transaction device of claim 5, wherein the glitch values comprise an exception count, an exception limit, and a delay value.

9. The transaction device of claim 8, wherein the first glitch criteria is satisfied when the exception count exceeds the exception limit.

10. The transaction device of claim 8, wherein the second glitch criteria satisfied when the exception count is non-zero, and wherein the delay is based on the exception count and the delay value.

11. The transaction device of claim 8, wherein the persistent memory comprises an exception indicator associated with one or more exceptions of the exception count.

12. The transaction device of claim 11, wherein the glitch instructions cause the at least one processing unit to access the exception indicator from the persistent memory, and wherein the delay is based on the exception indicator.

13. The transaction device of claim 8, wherein the processor is configured to identify an exception during execution of the bootloader instructions, and to increment the exception count when the exception is identified.

14. A method for mitigating power supply glitches at a transaction device, the method comprising:

accessing, by a processing unit of the transaction device, one or more glitch values from a persistent memory;

determining, by the processing unit, whether the one or more glitch values satisfy a first glitch criteria;

disabling, by the processing unit, one or more operations of the transaction device when the one or more glitch values satisfy the first glitch criteria;

determining, by the processing unit, whether the one or more glitch values satisfy a second glitch criteria;

identifying, by the processing unit, a delay when the glitch values satisfy the second glitch criteria; and executing, after the delay, bootloader instructions.

15. The method of claim 14, further comprising:

identifying, by a monitoring circuit, a glitch on a processing unit power supply;

generating, by the monitoring circuit, a glitch indicator when the glitch is identified;

providing, from the monitoring circuit to the persistent memory, the glitch indicator;

storing, by the persistent memory, the glitch indicator as one of the one or more glitch values; and disabling the one or more operations of the transaction device when one of the one or more glitch values comprise the glitch indicator.

16. The method of claim 14, wherein the persistent memory comprises a battery-backed memory.

17. The method of claim 14, wherein the glitch values comprise an exception count, an exception limit, and a delay value.

18. The method of claim 17, wherein the first glitch criteria is satisfied when the exception count exceeds the exception limit.

19. The method of claim 17, wherein the second glitch criteria satisfied when the exception count is non-zero, and wherein the delay is based on the exception count and the delay value.

20. The method of claim 17, wherein the persistent memory comprises an exception indicator associated with one or more exceptions of the exception count.

21. The method of claim 20, further comprising, accessing, by the processing unit, the exception indicator from the persistent memory, and wherein the delay is based on the exception indicator.

22. The method of claim 17, further comprising:

identifying, by the processing unit, an exception during execution of the bootloader; and incrementing, by the processing unit, the exception count when the exception is identified.

23. A non-transitory computer-readable storage medium comprising glitch instructions stored therein, which when executed by one or more processors of a transaction device, cause the one or more processors to perform operations comprising:

accessing one or more glitch values from a persistent memory;

determining whether the one or more glitch values satisfy a first glitch criteria; disabling one or more operations of the transaction device when the one or more glitch values satisfy the first glitch criteria;

determining whether the one or more glitch values satisfy a second glitch criteria;

identifying a delay when the glitch values satisfy the second glitch criteria; and initiating execution of bootloader instructions after the delay.

24. The non-transitory computer-readable storage medium of claim 23, wherein a glitch indicator is received at the persistent memory as one of the one or more glitch values from a monitoring circuit when the monitoring circuit identifies a glitch on a processing unit power supply, and wherein the glitch instructions cause the at least one processor to disable the one or more operations of the transaction device when the glitch indicator is stored as one of the one or more glitch values.

25. The non-transitory computer-readable storage medium of claim 23, wherein the glitch values comprise an exception count, an exception limit, and a delay value.

26. The non-transitory computer-readable storage medium of claim 25, wherein the first glitch criteria is satisfied when the exception count exceeds the exception limit.

27. The non-transitory computer-readable storage medium of claim 25, wherein the second glitch criteria satisfied when the exception count is non-zero, and wherein the delay is based on the exception count and the delay value.

28. The non-transitory computer-readable storage medium of claim 25, wherein the persistent memory comprises an exception indicator associated with one or more exceptions of the exception count.

29. The non-transitory computer-readable storage medium of claim 28, wherein the instructions further comprise instructions that cause the one or more processors to perform operations comprising accessing the exception indicator from the persistent memory, and wherein the delay is based on the exception indicator.

30. The non-transitory computer-readable storage medium of claim 25, wherein the instructions further comprise instructions that cause the one or more processors to perform operations comprising:
   identifying an exception during execution of the bootloader; and
   incrementing the exception count when the exception is identified.

31. The method of claim 14, wherein the transaction device comprises at least one bootloader memory, wherein the bootloader memory comprises glitch instructions and the bootloader instructions, and wherein the executing, after the delay, the bootloader instructions comprises executing, by the processing unit, the glitch instructions prior to executing the bootloader instructions.

32. The method of claim 14, wherein the determining whether the one or more glitch values satisfy the first glitch criteria comprises determining whether a first value of the one or more glitch values exceeds a threshold, and wherein the determining whether the one or more glitch values satisfy the second glitch criteria comprises determining whether the first value is within a range that is lower than the threshold.

33. The method of claim 32, wherein the first value is an exception count.

34. The non-transitory computer-readable storage medium of claim 23, wherein the determining whether the one or more glitch values satisfy the first glitch criteria comprises determining whether a first value of the one or more glitch values exceeds a threshold, and wherein the determining whether the one or more glitch values satisfy the second glitch criteria comprises determining whether the first value is within a range that is lower than the threshold.

35. The non-transitory computer-readable storage medium of claim 34, wherein the first value is an exception count.

\* \* \* \* \*